US009043391B2

(12) United States Patent
Husain et al.

(10) Patent No.: US 9,043,391 B2
(45) Date of Patent: May 26, 2015

(54) CAPTURING AND RESTORING SESSION STATE OF A MACHINE WITHOUT USING MEMORY IMAGES

(71) Applicant: Citrix Systems, Inc., Fort Lauderdale, FL (US)

(72) Inventors: Syed Mohammad Amir Husain, Round Rock, TX (US); Muhammad Umair, Cedar Park, TX (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 180 days.

(21) Appl. No.: 13/724,665

(22) Filed: Dec. 21, 2012

(65) Prior Publication Data
US 2013/0117359 A1 May 9, 2013

Related U.S. Application Data

(63) Continuation-in-part of application No. 12/032,462, filed on Feb. 15, 2008, now abandoned.

(60) Provisional application No. 60/889,994, filed on Feb. 15, 2007.

(51) Int. Cl.
*G06F 13/00* (2006.01)
*H04L 29/08* (2006.01)
*G06F 9/445* (2006.01)

(52) U.S. Cl.
CPC ........... *H04L 67/34* (2013.01); *G06F 9/445* (2013.01)

(58) Field of Classification Search
CPC ............ H04L 29/08072; H04L 29/06; H04L 29/0809; H04L 29/06047; H04L 67/34; G06Q 30/02; G06F 9/445

USPC .................................................. 709/203, 228
See application file for complete search history.

(56) References Cited

U.S. PATENT DOCUMENTS

| 4,949,254 A | 8/1990 | Shorter |
| 5,291,597 A | 3/1994 | Shorter et al. |
| 5,990,892 A | 11/1999 | Urbain |

(Continued)

OTHER PUBLICATIONS

Clark et al.; "Live Migration of Virtual Machines;" In Proceedings of the 2nd ACM/USENIX Symposium on Networked Systems Design and Implementation (NSDI), May 2-4, 2005; pp. 1-14.

(Continued)

*Primary Examiner* — Robert B Harrell
(74) *Attorney, Agent, or Firm* — Finnegan, Henderson, Farabow, Garrett & Dunner LLP

(57) ABSTRACT

System and method for capturing and/or restoring session state of a machine without using image files. Session state information for a first computer system may be captured in a structured state capture file (SSCF) using metadata to represent the session state and steps or actions which produced the session state, and does not include a memory image or memory dump of the first computer system. The SSCF may be stored, and subsequently provided for restoration of the session state on the first computer system or a different computer system. A server computer system may store the SSCF (with other SSCFs) and may provide the SSCF to the first computer system or a different computer system over a network for session state restoration, e.g., in response to a request over the network. The first computer system may implement a virtual machine (VM). The session state may be that of the VM.

25 Claims, 23 Drawing Sheets

(56) References Cited

U.S. PATENT DOCUMENTS

| | | |
|---|---|---|
| 6,223,202 B1 | 4/2001 | Bayeh |
| 6,802,062 B1 | 10/2004 | Oyamada et al. |
| 7,200,848 B1 | 4/2007 | Slaughter et al. |
| 7,246,174 B2 | 7/2007 | Sciandra et al. |
| 7,254,634 B1 * | 8/2007 | Davis et al. .......... 709/228 |
| 7,260,820 B1 | 8/2007 | Waldspurger et al. |
| 7,313,793 B2 | 12/2007 | Traut et al. |
| 7,383,327 B1 | 6/2008 | Tormasov et al. |
| 7,383,405 B2 | 6/2008 | Vega et al. |
| 7,428,636 B1 | 9/2008 | Waldspurger et al. |
| 7,461,223 B2 | 12/2008 | Anand et al. |
| 7,480,773 B1 | 1/2009 | Reed |
| 7,577,722 B1 | 8/2009 | Khandekar et al. |
| 7,603,670 B1 | 10/2009 | van Rietschote |
| 8,073,926 B2 | 12/2011 | Traut et al. |
| 8,176,486 B2 | 5/2012 | Husain |
| 2003/0126236 A1 | 7/2003 | Marl et al. |
| 2004/0088413 A1 | 5/2004 | Bhogi et al. |
| 2004/0153708 A1 | 8/2004 | Joshi et al. |
| 2005/0060590 A1 | 3/2005 | Bradley et al. |
| 2005/0289540 A1 | 12/2005 | Nguyen et al. |
| 2006/0136912 A1 | 6/2006 | Robinson et al. |
| 2006/0143617 A1 | 6/2006 | Knauerhase et al. |
| 2006/0155674 A1 | 7/2006 | Traut et al. |
| 2007/0011268 A1 | 1/2007 | Banga et al. |
| 2007/0094348 A1 | 4/2007 | Scheidel et al. |
| 2007/0169121 A1 | 7/2007 | Hunt et al. |
| 2007/0174429 A1 | 7/2007 | Mazzaferri et al. |
| 2007/0174458 A1 | 7/2007 | Boyce et al. |
| 2007/0179955 A1 | 8/2007 | Croft et al. |
| 2007/0180436 A1 | 8/2007 | Travostino et al. |
| 2007/0180448 A1 | 8/2007 | Low et al. |
| 2007/0220121 A1 | 9/2007 | Suwarna |
| 2007/0245348 A1 | 10/2007 | Araujo et al. |
| 2007/0250833 A1 | 10/2007 | Araujo et al. |
| 2007/0260702 A1 | 11/2007 | Richardson et al. |
| 2007/0266383 A1 | 11/2007 | White |
| 2007/0271560 A1 | 11/2007 | Wahlert et al. |
| 2007/0300221 A1 | 12/2007 | Hartz et al. |
| 2008/0022032 A1 | 1/2008 | Nicholas et al. |
| 2008/0077690 A1 | 3/2008 | Miyajima |
| 2008/0080514 A1 | 4/2008 | Louzoun et al. |
| 2008/0104195 A1 | 5/2008 | Hawkins et al. |
| 2008/0134178 A1 | 6/2008 | Fitzgerald et al. |
| 2008/0184229 A1 | 7/2008 | Rosu et al. |
| 2008/0201414 A1 | 8/2008 | Amir Husain et al. |
| 2008/0201455 A1 | 8/2008 | Husain |
| 2008/0201479 A1 | 8/2008 | Husain et al. |
| 2008/0263258 A1 | 10/2008 | Allwell et al. |
| 2008/0271033 A1 | 10/2008 | Kamura |
| 2008/0301770 A1 | 12/2008 | Kinder |
| 2008/0320269 A1 | 12/2008 | Houlihan et al. |
| 2009/0119663 A1 | 5/2009 | Mukherjee et al. |
| 2009/0204826 A1 | 8/2009 | Cox et al. |
| 2009/0217296 A1 | 8/2009 | Gebhart et al. |
| 2009/0222496 A1 | 9/2009 | Liu et al. |
| 2009/0249332 A1 | 10/2009 | Hoehle et al. |
| 2009/0282404 A1 | 11/2009 | Khandekar et al. |
| 2010/0088699 A1 | 4/2010 | Sasaki |
| 2012/0011509 A1 | 1/2012 | Husain |

OTHER PUBLICATIONS

Rosenblum, Mendel; Garfinkel, Tal; "Virtual Machine Monitors: Current Technology and Future Trends;" IEEE Computer Society, vol. 38, No. 5, May 2005; pp. 39-47.

Harney et al.; "The Efficacy of Live Virtual Machine Migrations Over the Internet"; 2005; Clemson University; pp. 1-7.

Bloke; Migrating from VMware to VirtualBox (Part 1): Oracle Enterprise Linux; Feb. 9, 2010; pp. 1-12.

* cited by examiner

Table 1

| Time | Active Users | Free VM's |
|---|---|---|
| T1 | 0 | 2 |
| T2 | 1 | 2 |
| T3 | 2 | 2 |
| T4 | 3 | 1 |
| T5 | 4 | 0 |

Table 2

| Time | Active Users | Free VM's |
|---|---|---|
| T1 | 0 | 2 |
| T2 | 1 | 2 |
| T3 | 2 | 2 |
| T4 | 3 | 2 |
| T5 | 4 | 1 |

Table 3

| Time | Active Users | Free VM's |
|---|---|---|
| T1 | 0 | 2 |
| T2 | 1 | 2 |
| T3 | 2 | 2 |
| T4 | 3 | 1 |
| T5 | 4 | 1 |

Table 4

| Time | Active Users | Free VM's |
|---|---|---|
| T1 | 0 | 2 |
| T2 | 1 | 2 |
| T3 | 2 | 2 |
| T4 | 3 | 2 |
| T5 | 4 | 2 |

FIG. 5B

```
C:\ C:\Windows\system32\cmd.exe snmp.exe
Rtvscan.exe                                                                                     2444
svchost.exe                                                                                     2592
svchost.exe                                                                                     2788
taskhost.exe          "taskhost.exe"                                                            2828
dwm.exe               "C:\Windows\system32\Dwm.exe"                                             3772
explorer.exe          C:\Windows\Explorer.EXE                                                   3920
SmcGui.exe                                                                                      3940
ProtectionUtilSurrogate.exe                                                                     3976
SearchIndexer.exe                                                                               3116
ccApp.exe             "C:\Program Files\Common Files\Symantec Shared\ccApp.exe"                 4072
MOM.exe               "C:\Program Files (x86)\ATI Technologies\ATI.ACE\Core-Static\MOM"         1204
CCC.exe               "C:\Program Files (x86)\ATI Technologies\ATI.ACE\Core-Static\CCC.exe" 0   4168
PresentationFontCache.exe                                                                       4296
iexplore.exe          "C:\Program Files (x86)\Internet Explorer\iexplore.exe"                   4344
iexplore.exe          "C:\Program Files (x86)\Internet Explorer\iexplore.exe" SCODEF:2972 CREDAT:203014  2972
-- More --
```

FIG. 13

| | | |
|---|---|---|
| Inbox - amir.husain@dearcube.com - Microsoft... | Running | TopLeft: 100 Width: 231 Height: 400 |
| listwindows.pl - Notepad | Running | TopLeft: 150 Width: 531 Height: 40 |
| School VDI - Microsoft Word | Running | TopLeft: 550 Width: 544 Height: 70 |
| StateCaptureAndRestorationMethodology - Micr... | Running | TopLeft: 850 Width: 531 Height: 40 |
| Untitled - Paint | Running | TopLeft: 850 Width: 531 Height: 40 |
| VDIworksDaaSManagerApplicationIntroduction-8... | Running | TopLeft: 850 Width: 531 Height: 40 |

FIG. 14

CAPTURING AND RESTORING SESSION STATE OF A MACHINE WITHOUT USING MEMORY IMAGES

PRIORITY CLAIM

This application is a continuation-in-part of U.S. patent application Ser. No. 12/032,462 titled "Transferring a Virtual Machine from a Remote Server Computer for Local Execution by a Client Computer" and filed on Feb. 15, 2008, whose inventors were Syed Mohammad Amir Husain and Muhammad Umair, which claims priority to U.S. provisional patent application Ser. No. 60/889,994 titled, "Virtualization Methods for a Blade Computing System," which was filed on Feb. 15, 2007, whose inventor was Syed Mohammad Amir Husain, and which are all hereby incorporated by reference in their entirety as though fully and completely set forth herein.

BACKGROUND OF THE INVENTION

1. Field of the Invention

The present invention relates generally to a system and method for capturing and restoring session information for a computer system via a metadata based structured state capture file that stores state information of a session.

2. Description of the Related Art

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

Many of these issues may be addressed by centralizing the locations of computing resources. For example, each individual user may connect through a network to a server computer system and use computing resources provided by the server computer system.

Some server computer systems are capable of leveraging the physical hardware resources available through virtualization. Virtualization provides the ability for multiple virtual machines to run together on the same physical server computer. For example, each virtual machine may execute its own operating system and may appear to a user of the virtual machine to be the same as an independent physical computer. The software layer that executes on the physical server computer and manages the various virtual machines is called a hypervisor or virtual machine host software. The hypervisor can run on bare hardware (called a Type 1 or native VM) or under control of an operating system (called a Type 2 or hosted VM).

Traditional means of taking a memory snapshot of a session state on a physical or virtual machine generally involves such actions as using a memory dump, register status and similar CPU/memory state information to instantly recreate the same state at a later date on a similar or the same system. It is important to note that such re-creation involves a "blind" replication of all elements of state, i.e. there is no differentiation between the states in which individual applications were running. When state is restored, it is restored for all apps that were running in the original session. More generally, this prior art technique involves a "wholesale" recreation of state; in other words, if N steps were taken to bring the execution state to a specified point, this method of state capture is only concerned with the Nth state, and is specifically not concerned with the N-1, N-2, etc., states, i.e., all the previous steps that were necessary to evolve the session state to its Nth state. This approach thus severely limits the control and subtlety allowed in the capture and (re)establishment or restoration of VM state.

SUMMARY

Various embodiments of a system and method for capturing and restoring session state of a machine, e.g., a computer system or virtual machine, without using memory images are disclosed.

In one embodiment, session state information for a first computer system may be captured in a structured state capture file (which may be implemented as one or more files or data objects, as desired). In other words, the session state information for the first computer system may be determined and stored in the structured state capture file. The structured state capture file may include metadata describing the session state and does not include a memory image or memory dump of the first computer system. Moreover, in some embodiments, the (metadata based) structured state capture file may further include steps or actions that led to the session state. In other words, in some embodiments, the structured state capture file may use metadata to encode or represent both the session state and the steps or actions which produced the session state.

The session state information may include state information regarding any of various (software and/or hardware) components of the computer system. For example, the session state information may include one or more of: one or more applications currently executing on the first computer system, one or more processes (including background processes) or services currently executing on the first computer system, one or more network shares (storage devices or printers) currently mounted on the first computer system, one or more documents presently open on the first computer system, location, size, and placement of one or more windows on the first computer system, one or more user profiles currently in use by the first computer system, one or more background images and any other desktop customizations employed on the first computer system, location and placement of one or more mouse or keyboard cursors of the first computer system, placement of one or more icons and their order in a start bar or dock of the first computer system, or text entered in one or more browser windows, text fields or other text areas on the first computer system, among others. In other words, state information regarding any component of the computer system (which may be a virtual or physical machine) may be captured in the structured state capture file, as desired.

The structured state capture file may be stored in a memory of the first computer system. The structured state capture file may be useable to restore the session state on the first computer system or a different computer system via recapitulation of the steps or actions that led to the session state. Said another way, the structured state capture file may be useable to restore or instantiate the session state on the first computer system or a different computer system in a stepwise manner by performing the steps or actions that put the computer system into the session state.

In some embodiments, a structured state capture file (as described above, which may be implemented as one or more files or data objects, as desired) that includes session state information for a first computer system may be received, e.g., by a computer system, e.g., the first computer system or a different computer system. In some embodiments, the received structured state capture file may have been generated via an embodiment of the method session state capture disclosed above, e.g., performed by the first computer system.

The session state may be restored (i.e., established or instantiated) on the computer system (e.g., the first computer system or a different computer system) using the structured state capture file. The session state may be restored by retrieving session state information and the steps or actions that led to the session state from the structured state capture file, and recapitulating the steps or actions on the computer system, thereby establishing the session state on the computer system.

Said another way, the structured state capture file may be used to restore or instantiate the session state of the first computer system on the first computer system or a different computer system in a stepwise manner by performing the steps or actions that put the first computer system into the session state.

In some embodiments, the structured state capture file may be stored on a server computer, possibly along with other structured state capture files that store session state information for other computers and/or the first computer system at other times. The structured state capture file (and/or any of the other structured state capture files) may be provided to the first computer system or any other computer systems for restoration or establishment of the session state.

BRIEF DESCRIPTION OF THE DRAWINGS

A better understanding of the present invention can be obtained when the following detailed description of the embodiment is considered in conjunction with the following drawings, in which:

FIG. 5B illustrates various examples of algorithms for maintaining the number of free virtual machines in the pool over time;

FIG. 13 is an exemplary screenshot illustrating the capture of information regarding currently running processes, according to one embodiment;

FIG. 14 is an exemplary screenshot illustrating the capture of information regarding active windows and their locations;

Figure 1:
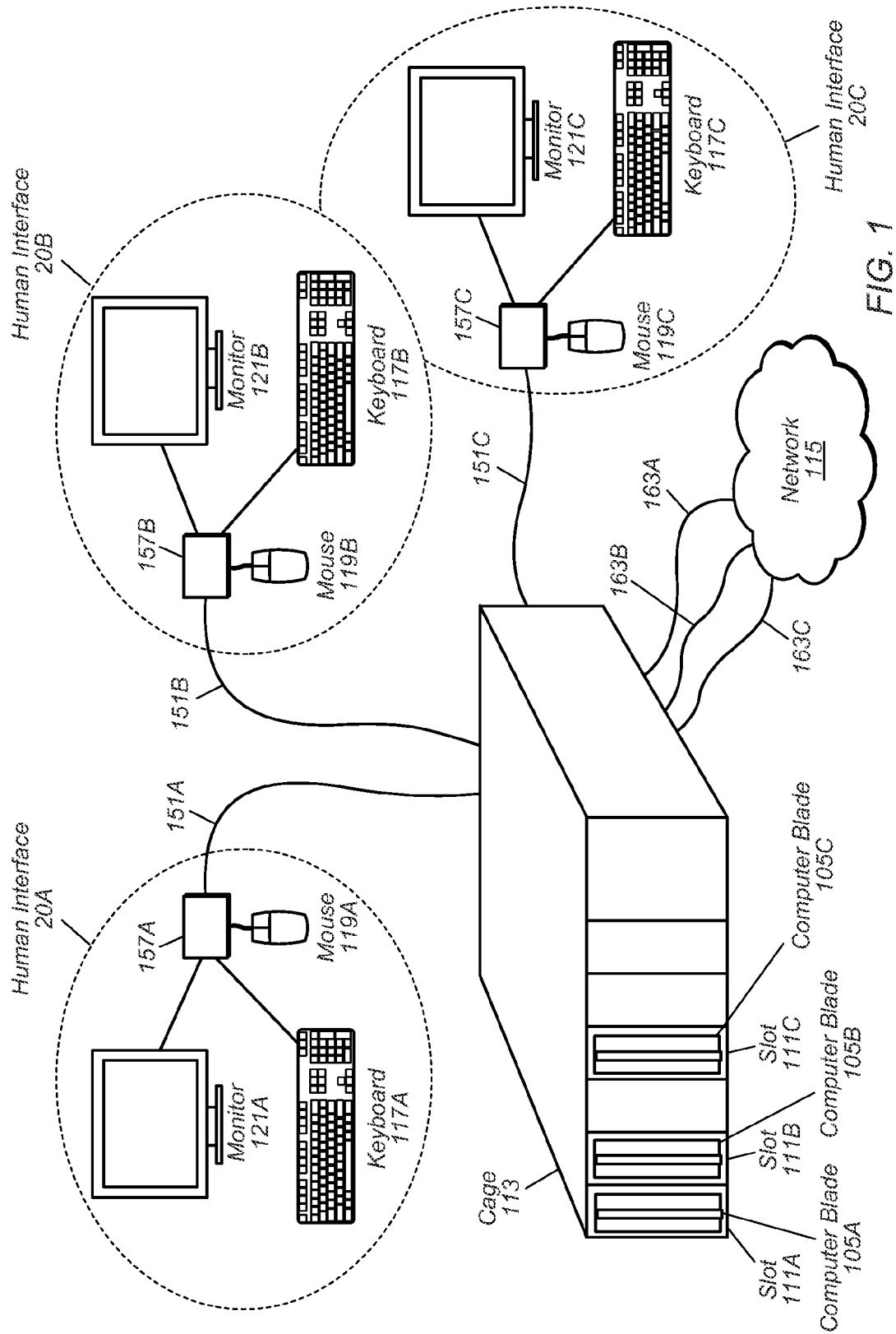
FIG. 1 illustrates computer systems including peripheral devices coupled to computer blades in a cage, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

INCORPORATION BY REFERENCE

The following applications are hereby incorporated by reference:

U.S. patent application Ser. No. 12/032,462, titled, "Transferring a Virtual Machine from a Remote Server Computer for Local Execution by a Client Computer," which was filed on Feb. 15, 2008, which claims benefit of priority to U.S. provisional patent application Ser. No. 60/889,994 titled, "Virtualization Methods for a Blade Computing System," which was filed on Feb. 15, 2007, whose inventor was Syed Mohammad Amir Husain, both of which were incorporated by reference above.

U.S. provisional patent application Ser. No. 60/889,994 titled, "Virtualization Methods for a Blade Computing System," which was filed on Feb. 15, 2007, whose inventor was Syed Mohammad Amir Husain.

DETAILED DESCRIPTION OF EMBODIMENTS

Various systems and methods for capturing and restoring session state of a machine, e.g., a virtual machine or a physical machine, e.g., computer system, are described herein. The session state may be captured or stored in a metadata based structured state capture file that stores the state information of a client session as well as steps or actions that produced the session state, and may be useable to restore the session state on a machine by recapitulating the steps or actions.

FIGS. 1-4—Blade Computer Systems

In some embodiments the server computer system may include a blade server computer system, also referred to herein as a blade computer system. In a blade server computer system, multiple physical server computers, e.g., PC's, may be installed into a central frame or cabinet (e.g., physical chassis). Different sets of human interface hardware (e.g., keyboard, display device, mouse, etc.) for interacting with the server computers may be located at remote locations from the central cabinet. In one approach, each physical server computer in the system may be a "computer on a card", also referred to as a computer blade or "blade". For example, each server computer may be included on a circuit card that may include standard computing system components such as a CPU, memory, power supply, and network interface, as well as an extender, e.g., a USB or PCI extender, for communicating with the remote human interface. A server computer system in which a plurality of human interfaces are coupled via a network to a plurality of centralized computer blades is referred to herein as a blade server computing system.

FIGS. 1-4 illustrate components that may be used in various embodiments of a blade computing system. As FIG. 1 indicates, in one embodiment, the blade computing system may include a plurality of human interfaces 20 coupled to a cage or chassis 113 that includes a plurality of computer blades 105, where each computer blade 105 acts as a server computer. Each human interface 20 may include at least one peripheral device (e.g., keyboard 117, mouse 119, monitor 121, etc.) that enables a user to provide user input to and/or receive output from a respective computer blade 105, or a respective virtual machine executing on a computer blade 105. Each computer blade 105 may include various components necessary for computer operations, such as, but not limited to, a processor and a storage medium.

As FIG. 1 shows, connecting cables 151 may connect computer blades 105 to respective human interfaces 20, also referred to as peripheral device groups, through respective device ports or hubs 157 (e.g., C-Ports or I-Ports). In one embodiment, each device port may comprise an extender device that may enable transmission of user interface signals (i.e., peripheral device signals) over distances generally not allowed by standard protocols such as USB.

In one embodiment, the human interfaces 20 or peripheral device groups, such as the human interface 20A, may include a keyboard 117, a pointing device, e.g., a mouse 119, a display device, e.g., a computer monitor 121, and/or other peripheral devices for human interface. A computer blade 105, such as computer blade 105A, may communicate with the peripheral devices coupled to the computer blade 105 by sending and receiving encoded human interface signals transmitted over the respective connecting cable 151. In one embodiment, a cage 113, e.g., a metal cabinet or chassis, may have a plurality of slots 111. The computer blades 105A, 105B, and 105C may be inserted into the slots 111A, 111B, and 111C, respectively. The cage 113 may also include cage connectors (not shown) to couple the computer blades 105 to their respective connecting cables 151.

The computer blades 105 may be installed in the cage 113 at a central location, while each human interface 20 (e.g., each peripheral device group) may be located remotely from the cage 113, such as at respective work areas of the users of the computer blades 105. The separation of the human interfaces 20 from the computer blades 105 may allow easier software installation across a network, such as but not limited to downloading CD-ROMs, and may provide a central location of multiple server computers which may simplify both hardware and software maintenance.

Each computer blade 105 may also be coupled to a network 115 through an on-board network logic (not shown). The network 115 may be a Local Area Network (LAN) or a Wide Area Network (WAN), such as the Internet, although other networks, e.g, wireless, cellular, etc., are also contemplated. As mentioned above, in one embodiment, the computer blades 105 may be inserted into respective slots 111 of the cage 113, and coupled to respective peripheral device groups through the cage connectors (not shown) and connecting cables 151. In one embodiment, each computer blade 105 may also be coupled to the network 115 through the cage connectors (not shown) and a network cable, such as Ethernet cables 163.

While the embodiment of FIG. 1 illustrates a blade computing system, it is noted that in other embodiments the server computer system described herein may include other types and forms of computers. In other words, the server computer system embodiment shown in FIG. 1 is intended to be an example only, and is not intended to limit the types or number of server computers used in the server computer system. For further information regarding the use of multiple computer blades in a system, please see U.S. patent application Ser. No. 09/728,667 titled "Computer On A Card With A Remote Human Interface".

Figure 2:
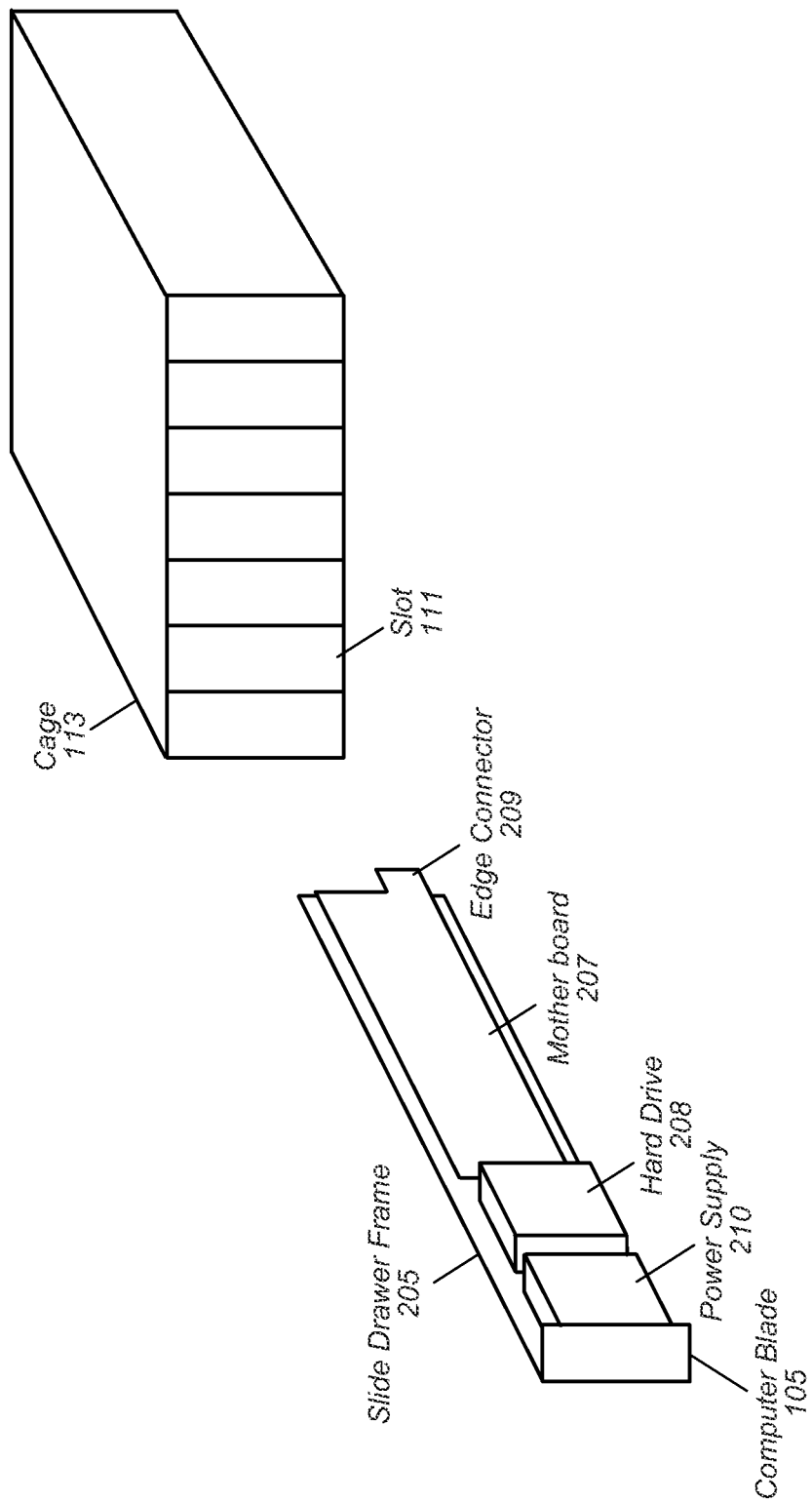
FIG. 2 illustrates a computer blade, according to one embodiment.

FIG. 2—Computer Blade

Referring to FIG. 2, an embodiment of a computer blade 105 is shown. In one embodiment, the computer blade 105 may include various components for computer operations, such as, but not limited to, a motherboard 207, a power supply 210, and a hard drive 208, as shown. In one embodiment, the motherboard 207, the power supply 210, and the hard drive 208 may be coupled to or mounted on a slide drawer frame 205. In one embodiment, the slide drawer frame 205 may be three rack units high (or approximately 5.25 inches), thus occupying a much smaller space than standard PC units, although other slide drawer frame 205 dimensions may also be used.

The motherboard 207 may be a printed circuit board with components such as, but not limited to, a central processing unit (CPU), memory, and LAN interface. Other types of motherboards and other types of motherboard components are also contemplated. The computer blade 105 may include one or more storage devices that implement non-volatile storage, such as a hard drive 208, optical drive, and/or flash memory. The computer blade 105 may communicate with external systems, e.g., peripheral devices and networks, through an edge connector 209. In one embodiment, the edge connector 209 may transmit signals such as, but not limited to, network signals, input/output (I/O) signals, video signals, audio signals, and universal serial bus (USB) signals. For example, the edge connector may communicate network signals to a network and encoded human interface signals to a group of peripheral devices.

In one embodiment, the computer blade 105 may further include power supply 210 mounted on the slide drawer frame 205 with an internal power source or coupled to an external power source (not shown) to provide power to the computer blade 105. The power supply 210 may convert local main power to an appropriate voltage for the computer blade 105. Because the computer blade 105 has an individual power supply 210, if the power supply 210 fails, the computer blade 105 may be the only computer blade that fails. In one embodiment, a single power supply located in the cage 113 may supply power to several computer blades 105. However, a single power supply for the cage 113 may be a single point of failure for the cage 113. If the single power supply fails, multiple computer blades 105 may also fail, requiring multiple replacement blades. In a system with a single power supply for a cage 113, the computer blades 105 may require one or more stand-by replacement blades connected to another power source. If the power supply for the cage 113 fails, information from the computer blades 105 may be copied onto the replacement computer blades from other computer blades in the system to which information from the computer blades 105 had been previously copied.

As FIG. 2 also illustrates that, in one embodiment, cage 113 may have a plurality of slots, such as slot 111, to house the computer blade 105. The computer blade 105 may be inserted into one of the slots 111 of the cage 113. The cage 113 may include a cage connector (not shown) to couple to the edge connector 209 on the computer blade 105. The cage connector may also include an external second connector (not shown) that is electrically coupled to the computer blade 105 when the computer blade 105 is inserted into the slot 107. The external second connector may be further coupled to the connecting cables 151 (shown in FIG. 1) for communication of the encoded human interface signals to a group of peripheral devices at a remote location. The use of the cage connectors as an intermediate connection between computer blade 105 and the connecting cable 151 may allow the removal and exchange of computer blade 105 without the need to disconnect the connecting cable 151 from the cage 113. If the computer blade 105 fails, the computer blade 105 may be removed and a new computer blade inserted. As noted above, in one embodiment, when a computer blade 105 fails, the user's human interface, e.g., one or more peripheral devices, may be switched to a replacement computer blade 105 (possibly in a manner that is transparent to the user), after which the failed computer blade 105 may be removed and replaced.

Figure 3:
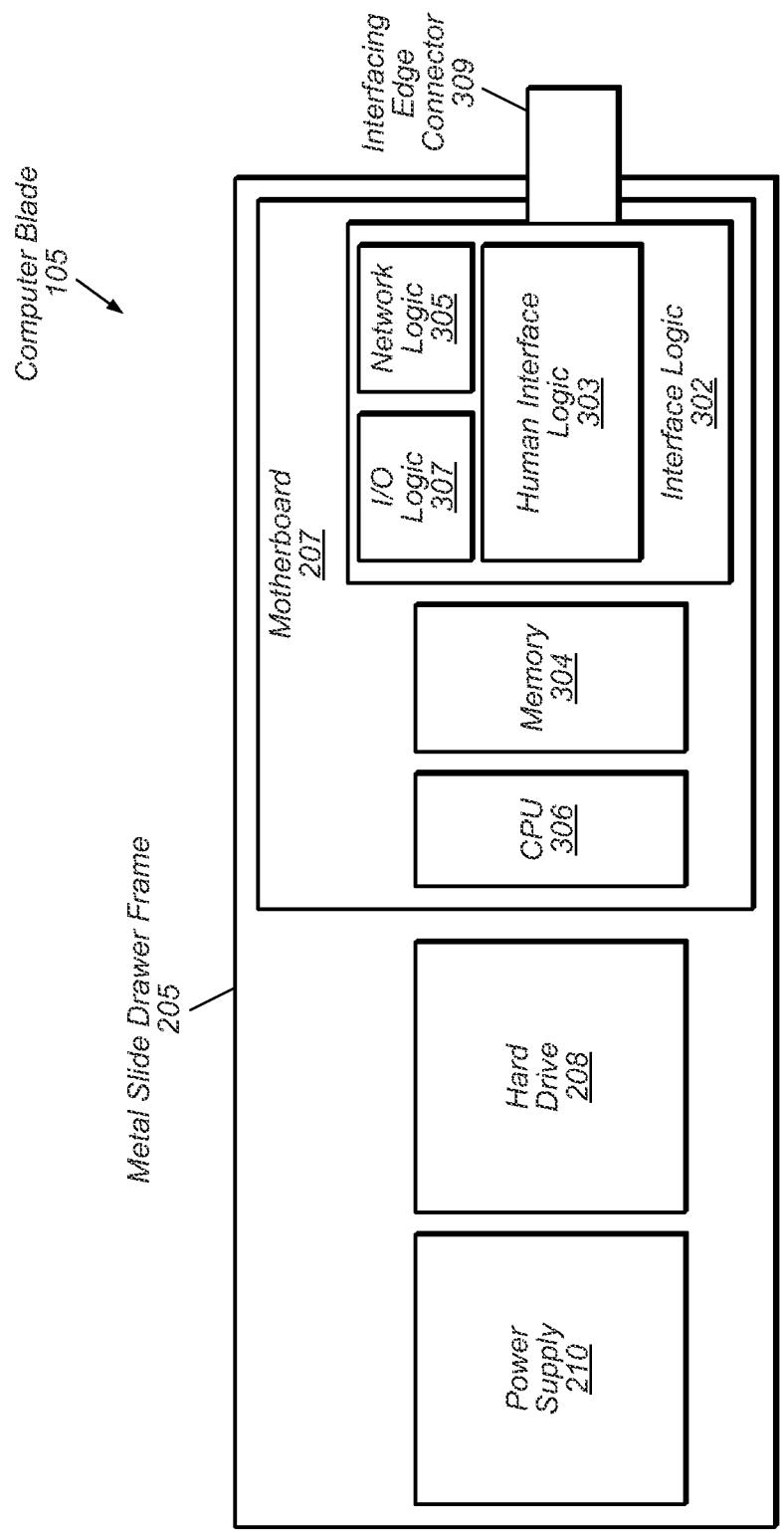
FIG. 3 illustrates a computer blade having a power supply, hard drive, and motherboard, according to one embodiment.

FIG. 3—Computer Blade Components

Referring to FIG. 3, an embodiment of a computer blade 105 having a power supply 210, hard drive 208, and motherboard 207 is shown. The computer blade 105 may include elements that make up a standard PC, such as, but not limited to, a motherboard 207 with various components such as but not limited to a processor, e.g., a CPU 306, memory 304, and interface logic 302, which may include network logic 305, I/O logic 307, and interface logic 303, as well as other interface circuitry associated with a motherboard 207, configured on a single card. The network logic 305 may include a LAN or WAN connection, such as but not limited to an IEEE 803.2 (10/100 BaseT) Ethernet, and circuitry for connecting to peripheral devices coupled to the computer blade 105. The computer blade 105 may be electrically coupled to the cage 113 (shown in FIG. 2) through the edge connector 209 that may face to the rear of the computer blade 105. In one embodiment, the computer blade 105 may slide into a slot 107 (shown in FIG. 2) of the cage 113 (shown in FIG. 2), making contact with the cage connector (not shown).

In one embodiment, the computer blade 105 may further include a network interface logic 305 included on a printed circuit board for interfacing to a network. The network logic 305 may encode network signals into a format suitable for transmission to the network. The network logic 305 may also receive encoded network signals from the network, and decode the encoded network signals. In one embodiment, the motherboard 207 may further include logic supporting PCI slot-based feature cards.

In one embodiment, the components on the computer blade 105 may be arranged from front to back for thermal efficiency. The interface logic 302 may be located at the rear of the computer blade 105, while the power supply 210 and hard disk 208 may be located at the front of the computer blade 105. In one embodiment, the computer blade 105 may have different slide drawer frame shapes, such as but not limited to square, rectangle, cubic, and three-dimensional rectangular forms. In one embodiment, the computer blade 105 may have components mounted on either side of the computer blade 105. The computer blade 105 may also have components mounted on both sides of the computer blade 105. If the slide drawer frame 205 has a three-dimensional shape, the components may be mounted on an inside surface and outside surface of the slide drawer frame 205.

Figure 4A:
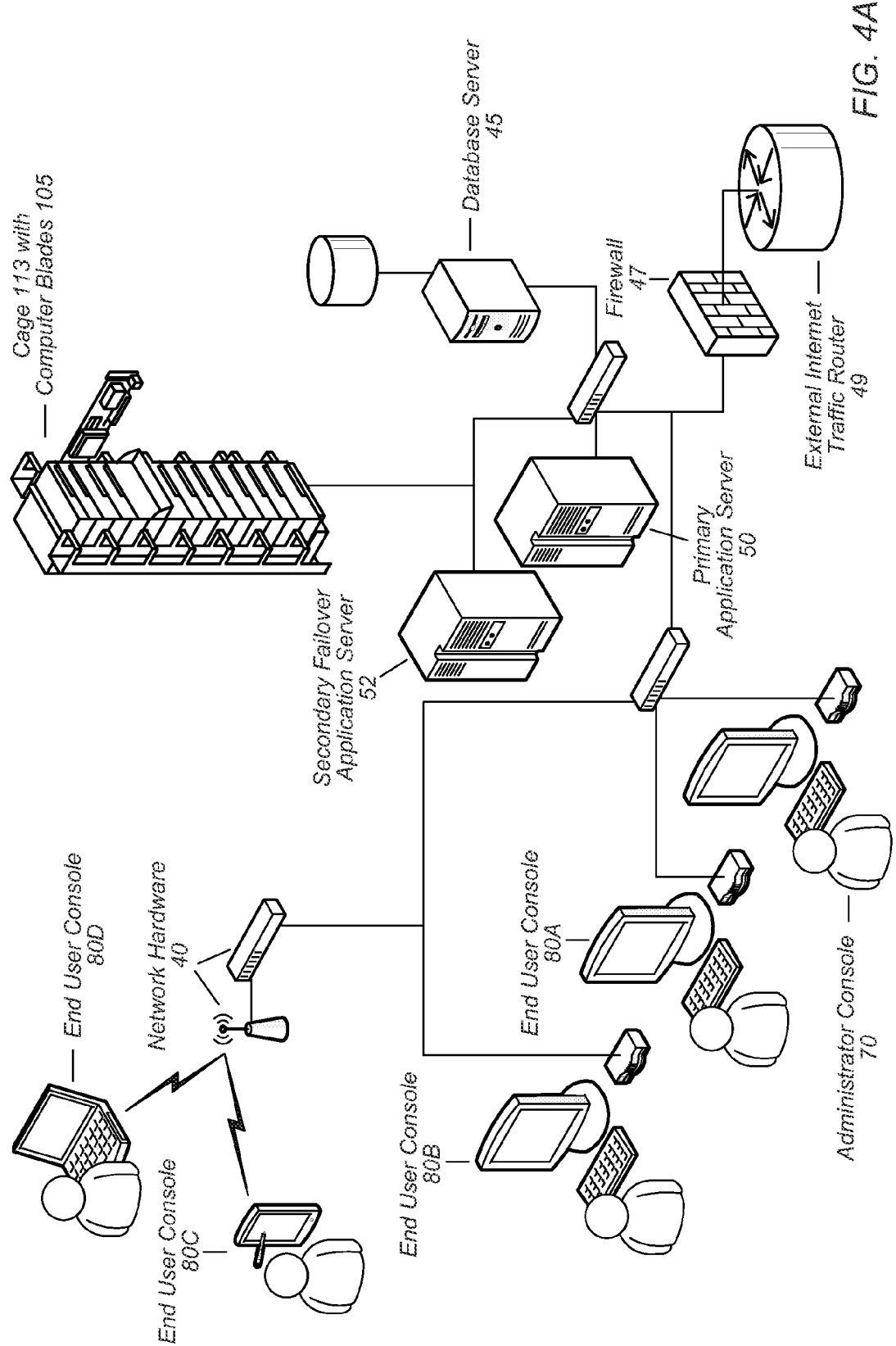
FIG. 4A illustrates an example of a blade computing system according to one embodiment.

FIG. 4A—Example Blade Computing System

FIG. 4A illustrates an example of a blade computing system according to one embodiment. The system includes a plurality of end user consoles 80. Each end user console 80 may include a human interface 20, also referred to as a peripheral device group. Human end users utilize the end user consoles 80 to interact with software programs executing on computer blades 105. The end user consoles 80 may be geographically dispersed, while the computer blades 105 are located in a central location in a cage 113.

In some embodiments, there may be a one-to-one correspondence between the end user consoles 80 and the computer blades 105. For example, each computer blade 105 may correspond to one end user console 80. For example, a first user may utilize the end user console 80A to interact with software programs executing on a computer blade 105A, a second user may utilize the end user console 80B to interact with software programs executing on a computer blade 105B, etc.

In other embodiments, a computer blade 105 may correspond to or host multiple end user consoles 80. For example, as described below, in some embodiments each computer blade 105 may execute virtual machine host software that enables a plurality of virtual machines to execute on the computer blade 105. Each virtual machine may correspond to one of the end user consoles 80. As an example, a computer blade 105A may instantiate two virtual machines, where one of the virtual machines corresponds to an end user console 80A and the other virtual machine corresponds to an end user console 80B. In various embodiments, each computer blade 105 may execute any number of virtual machines and thus may correspond to or host any number of end user consoles 80.

In some embodiments the end user consoles 80 may communicate with the computer blades 105 through a wide area network, such as the Internet. The number of users connected to the computer blades 105 at any given time may vary. For example, in some embodiments, when a user needs to use a virtual machine he may establish a remote communication session in order to communicate with a virtual machine executing on one of the computer blades 105. When the user is finished using the virtual machine the remote communication session may end. Thus, at any given time, various numbers of users may have respective remote communication sessions open in order to use respective virtual machines implemented on the computer blades 105.

In various embodiments, the end user consoles 80 may communicate with the computer blades 105 using any kind of devices and communication software. As one example, an end user console 80A may communicate with a dedicated computer blade 105A through a NeoLinux I/Port client. As another example, an end user console 80B may communicate with a VMWare virtual machine executing on a computer blade 105B through an XPe I/Port client. As another example, end user consoles 80C and 80D may communicate through a web-browser interface via network hardware 40 with computer blades 105C and 105D.

In the embodiment illustrated in FIG. 4A, the system includes a primary application server 50. The primary application server 50 is an application server that acts as an interface between the administrator console 70, the database server 45, the end user consoles 80, and the computer blades 105. The primary application server 50 executes system management software 10 that enables the interaction among these components. The primary application server 50 may also support fault-tolerant failover to a secondary failover application server 52. The primary application server 50 may maintain security for the system and interact with the each of the nodes in the system, including the database server 45 that stores characteristics, information, and logs related to the system.

In some embodiments, only one primary application server is used in the system. When a primary and secondary application server are configured, failover is provided from the primary to the secondary. Every transaction that is managed by the primary application server 50 may include a final synchronization step to ensure that the secondary application server 52 is always in lock step. Thus, the secondary application server 52 may be act as a mirror image of the primary application server 50. The secondary application server 52 may receive one-way updates from the devices configured to communicate with both primary and secondary application servers. In the event of a failure with the primary application server 50, the secondary application server 52 may take over communications and become the primary application server 50 with no loss of configuration information.

The database server 45 may host a management database that includes information about the system. For example, the database may include information about computer blades 105 or other devices in the system, virtual machines executing on the computer blades 105, users that have been discovered on the network, etc. The database may store various kinds of information about the system environment, including inventory information, logs, mapping information, device health and status information (e.g., resource usage and performance statistics), security information, and management information. In some embodiments the database may be implemented as a relational database, e.g., using software such as Microsoft SQL Server or MySQL Server.

Each computer blade 105 may execute software that enables the computer blade to interact with the primary application server 50 and host software applications with which end users interact. For example, in some embodiments each computer blade 105 may execute blade client software 12. In some embodiments, if a computer blade 105 executes virtual machines then each virtual machine executing on the computer blade 105 may execute the blade client software 12. In some embodiments the blade client software 12 may be executed by both the host computer blade and by each virtual machine executing on the computer blade 105. For example, for a host computer blade 105 with 4 virtual machines, 5 copies of the blade client software 12 may be executed—one for the host computer blade 105 and one on each virtual machine instantiation. In other embodiments the blade client software 12 may be executed by each virtual machine on a host computer blade 105 but may not be executed by the host computer blade 105 itself.

If a computer blade 105 hosts one or more virtual machines then the computer blade 105 may also execute virtual machine host software that implements and manages the virtual machines. In various embodiments the computer blade 105 may execute any kind of virtual machine host software. Examples include Microsoft Virtual Server and VMware Server (or other virtualization platforms from VMWare, Inc.).

In some embodiments, the peripheral devices at each end user console 80 may connect to the primary application server 50 via a device port 157. The port 157 may enable the transmission of device signals between the peripheral devices and the primary application server 50. For example, in one embodiment a port 157 may include an I-Port that allows thin-client communication by encoding the device signals using an IP-based protocol. In another embodiment a port 157 may include a C-Port that encodes the device signals using a protocol that enables high-performance graphics transmission.

In some embodiments, port software 14 may be installed on each device port 157 in the system. For example, where a device port 157 includes an I-Port, I-Port client software may be installed on the I-Port. In various embodiments, any of various I-Ports may be supported, such as 18800 running Windows XPe, 18820 running Windows XPe, Eon e100 running Windows XPe, 18020 running NeoLinux, Eon e100 running NeoLinux, Capio One running NeoLinux, etc.

The system also includes one or more administrator consoles 70. The administrator console 70 provides an administrative graphical user interface through which an administrator may manage the system, e.g., by interacting with the system management software 10 executing on the primary application server 50. In various embodiments the system may include any number of administrator consoles 70.

The administrative graphical user interface may enable the administrator to manage the system and monitor resources in the system. For example, the administrative graphical user interface may enable the administrator to perform tasks such as: delivering software and driver updates to I/Port thin clients at the end user consoles 80; monitoring the health and status of end user consoles, computer blades 105, primary application server 50, database server 45, or other devices in the system; monitoring resource usage on the computer blades 105; managing virtual machines executing on the computer blades 105; assigning virtual machines to users; etc. The graphical user interface may provide the administrator an at-a-glance network-wide snapshot of key resource elements.

The administrative graphical user interface may also provide the administrator with control over the provisioning of computer blades 105 and their allocation to end user consoles 80. For example, in some applications, limiting a user to a single computer blade 105 or virtual machine has the potential to create imbalanced resource utilization. This is because while the same blade or virtual machine may have more than enough capability for a light workload at a particular time, it may provide too little computing or memory capacity for more demanding tasks at other times.

The system may also automate a number of help desk and service tasks that require physical intervention with traditional legacy PCs. For instance, if a virtual machine or blade goes down because of hardware or software failures, the system's sparing functionality may automatically allocate a new virtual machine or blade to the end user, or may enable an administrator to quickly assign a new virtual machine or blade to the end user. Similarly, if the administrator wishes to perform maintenance on a virtual machine or blade and needs to switch a user currently logged into that blade to another resource, he can do so easily using the system's switching-over-IP functionality.

It is noted that in some embodiments the server computer system may include multiple blade computing systems. For example, the server computer system may include multiple cages 113, where each cage includes a plurality of computer blades 105. In one embodiment, each of the cages 113 may be located physically close to each other, e.g., in the same room or at the same data center. In another embodiment, different cages 113 may be located separately from each other. As one example, different cages 113 may be located in different buildings of a large organization. As another example, different cages 113 may be located in different cities or even different countries.

Figure 4B:
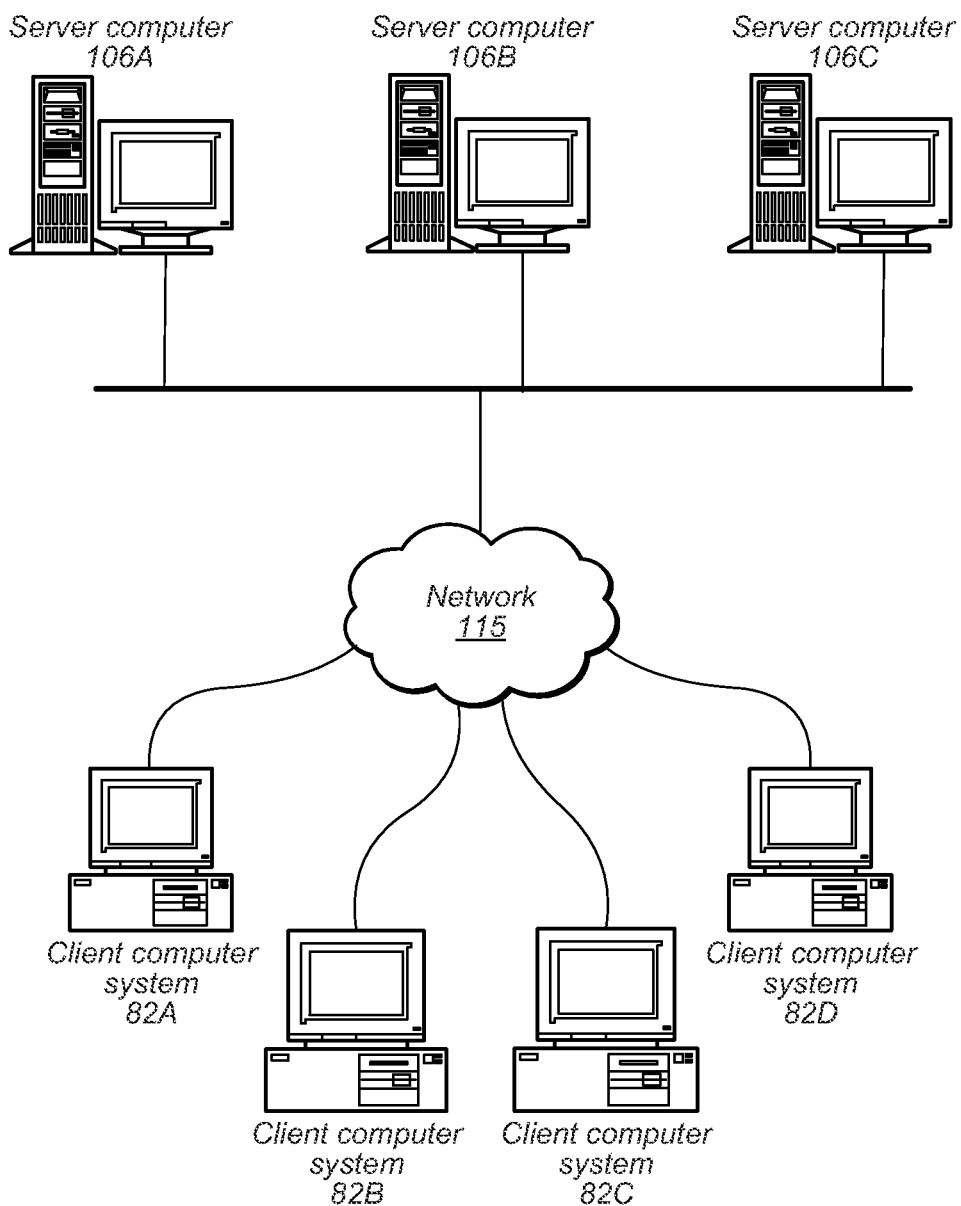
FIGS. 4B and 4C illustrate examples of a server computer system including a plurality of server computers.

FIG. 4B—Server Computer System Including Multiple Standalone Server Computers

In various embodiments the server computer system to which users connect may include any type and number of server computers. For example, in some embodiments the server computer system may not be implemented using a blade computing system, but may instead include a plurality of standalone server computers, e.g., traditional PCs. For example, FIG. 4B illustrates an example in which the server computer system includes a plurality of server computers 106. The server computers 106 may be coupled to each other and may also be coupled to a network 115. Each server computer 106 may execute virtual machine host software which implements a plurality of virtual machines executing on the server computer 106.

It is also noted that in various embodiments users may utilize any type of client hardware to connect to the server computer system. For example, in the embodiment illustrated in FIG. 4B, each user may utilize a respective client computer system 82. Each client computer system 82 may be any type of computer system, such as a PC or handheld computing device. A user of a respective client computer system 82 may interact with client software in order to connect to the server computer system through the network 115. In response to the user connecting to the server computer system, the user may be assigned to one of the virtual machines executing on one of the server computers 106.

In various embodiments, the network 115 may include any type of network or combination of networks. For example, the network 115 may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the server computers 106 and client computers 82 may each be coupled to the network 115 using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 4C:
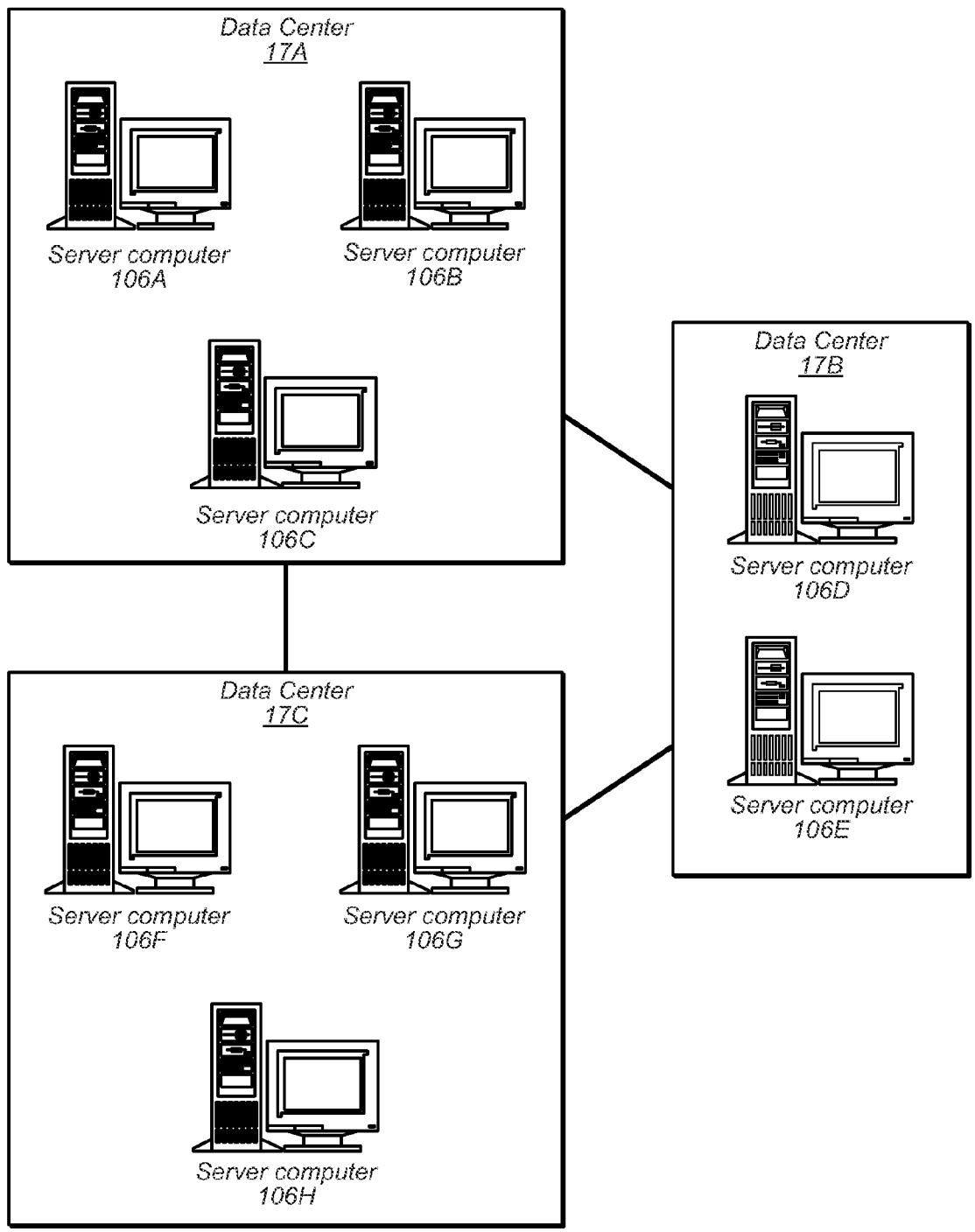

It is also noted that in some embodiments the server computer system may include multiple groups or clusters of server computers. For example, FIG. 4C illustrates an example in which three clusters of server computers 82 are located in three respective data centers 17. Server computers 82 in different data centers 17 may communicate with each other through a network. In some embodiments the server computers 82 in different data centers 17 may communicate through a Wide Area Network (WAN). For example, in some embodiments the server computers 82 in different data centers 17 may communicate through the Internet. For example, each data center 17 may be located in a different geographical location, e.g., a different city, country, or continent. In some embodiments, management software may execute in the server computer system to allow an administrator to manage resources on all the server computers 82 in the various data centers 17 from a central administrative user interface.

As another example, in some embodiments the server computer system may include multiple blade computing systems. For example, the server computer system may include a first chassis including a first plurality of blades 105 and a second chassis including a second plurality of blades 105. In some embodiments, different blade computing systems may be located at different data centers 17, e.g., different geographical locations. It is also noted that in some embodiments the system may include a combination of different types of server computers. For example, some server computers may be implemented as computing blades 105 installed in a blade computing system, and other server computers may be implemented as standalone computers 82.

For the remainder of this disclosure, the term "server computer" may refer to any type of server computer in the server computer system, e.g., a computing blade 105 such as illustrated in FIGS. 1-4 or a standalone server computer 82 or PC such as illustrated in FIG. 4B.

Maintaining a Pool of Free Virtual Machines

In some embodiments, each respective server computer (e.g., blade 105 or server computer 82) in the server computer system may be configured to execute virtual machine host software that enables the respective server computer to instantiate and execute a plurality of virtual machines. Executing a plurality of virtual machines on a respective server computer may enable multiple users to connect to the respective server computer, e.g., where each user interacts with software applications executed by a respective virtual machine on the respective server computer.

When a user connects to the server computer system, the user may be directed to a one of the server computers (e.g., blades 105 or server computers 82) in the server computer system and may be assigned a virtual machine executing on the server computer. Assigning the virtual machine to the user may comprise enabling the user (or a client device used by the user) to communicate with and use the virtual machine. The user may interact through the network with the virtual machine, e.g., by providing input to the virtual machine and receiving output from the virtual machine, similarly as if interacting with a physical computer. For example the communication between the user's client device and the server computer that executes the virtual machine may be performed using any of various remote communication protocols or virtualization protocols, such as VNC, RDP, ICA, TDX, PCoIP, etc.

When the user is directed to a given server computer, if a free virtual machine (that is, a virtual machine not already assigned to and in use by another user) is not currently executing on the server computer then it may be necessary to first create or instantiate a new virtual machine. Creating a new virtual machine may cause the user to experience a delay because of the overhead involved in creating and starting the new virtual machine. Thus, the user's experience may be improved if a free virtual machine which can be assigned to the user is already executing on the server computer in order to avoid the need to start a new one.

However, each virtual machine in an active state of execution on the server computer may utilize the server computer's resources, such as memory and CPU cycles. Thus, it may be wasteful to have many free virtual machines unnecessarily executing on the server computer when they are not in use.

Figure 5A:
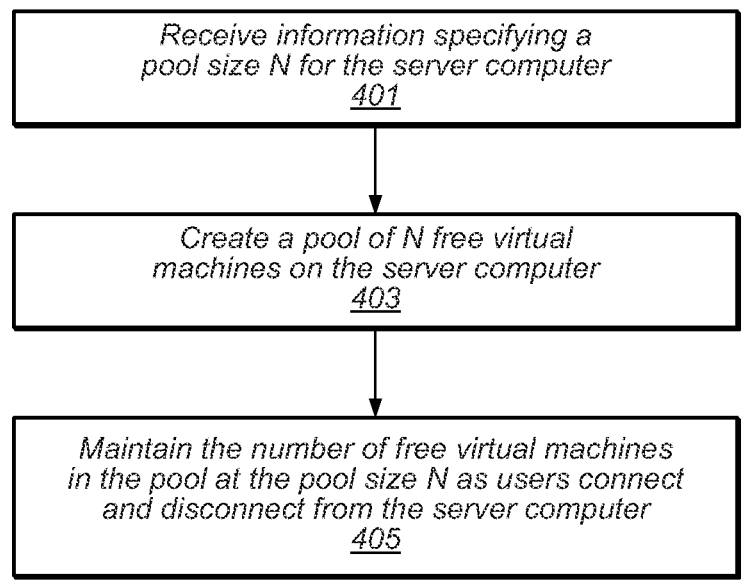
FIG. 5A is a flowchart diagram illustrating one embodiment of a method for maintaining a pool of free virtual machines on a server computer.

In some embodiments, the management software for the server computer system may enable an administrator to configure the various server computers in the system to maintain respective pools of free virtual machines. For example, for a particular server computer in the system, the administrator may provide user input specifying a pool size of N, which indicates that N free virtual machines should be maintained on the particular server computer, as indicated in block 401 of FIG. 5A. In response, the server computer may create and add N free virtual machines to the pool, as indicated in block 403, e.g., where N is a number greater than or equal to 1. Each of the free virtual machines in the pool may be available to be assigned to a user when needed in response to a user request to connect to the server computer. Thus, while each virtual machine in the pool may not currently be in use, it may be in an active state of execution (e.g., not hibernated to disk) so that it can readily be assigned to a user when necessary.

As indicated in block 405, the number of free virtual machines in the pool may be maintained at the pool size N as users connect and disconnect from the server computer. For example, suppose that the server computer receives a first request to assign a virtual machine to a first user. In response to the first request, the server computer may assign a first virtual machine from the pool to the first user. The user may then use the first virtual machine. For example, a remote communication session may be established between the server computer and a client computer system which the user is using. The client computer system may provide input to the first virtual machine that is running on the server computer and receive output from the first virtual machine through the remote communication session, e.g., using a remote communication protocol or virtualization protocol, such as RDP, VNC, ICA, TDX, PCoIP, etc.

Assigning the first virtual machine to the first user means that the first virtual machine is no longer free, since it is now being used by the user. Thus, the first virtual machine is removed from the pool in response to assigning it to the user.

In order to maintain the number of free virtual machines in the pool at the specified pool size N, the server computer may also add a new free virtual machine to the pool to replace the first virtual machine. In some embodiments, adding the new free virtual machine to the pool may comprise creating the new free virtual machine and adding the new free virtual machine to the pool. For example, the new free virtual machine may not exist at all, or may only exist in the form of a virtual machine image file which has not been instantiated into an active virtual machine. In other embodiments, the new free virtual machine may already exist but may be in a state of hibernation (e.g., execution of the virtual machine may be suspended and its state information may be stored on disk). Thus, the new free virtual machine may be removed from hibernation and returned to an active state of execution and then added to the pool. In this manner, the server computer may maintain a pool of free virtual machines available to be assigned to users.

In other embodiments the number of free virtual machines in the pool may not always be equal to the specified pool size of N, but may vary over time depending on factors such as the pool size and the number of users currently connected to the server computer. For example, in some embodiments the server computer may be configured with a maximum number of concurrent users, e.g., the maximum number of users that can be connected to the server computer (assigned to virtual machines on the server computer). In some embodiments, when a free virtual machine from the pool is assigned to a user, the server computer may compute a decision on whether to add a new virtual machine to the pool to replace the one that was assigned to the user based on the maximum number of concurrent users, the number of users currently assigned to virtual machines on the first server computer, and/or the pool size N.

In various embodiments, any of various algorithms may be used to determine the number of free virtual machines that should be in the pool at any given time, e.g., where the algorithm may be based on various parameters or conditions. FIG. 5B illustrates several examples of how the number of free virtual machines in the pool may vary over time. In these examples, it is assumed that a maximum number of 4 users can be assigned to virtual machines executing on the server computer, and the server computer has been configured with a pool size of N. (In various embodiments a server computer may be configured to allow any maximum number of concurrent users.)

In the example of Table 1, at time T1 there are no active users, and there are 2 free virtual machines in the pool. At time T2, a user has connected to the server computer. One of the free virtual machines in the pool was assigned to the user, and a new free virtual machine was added to the pool to maintain its number at 2. At time T3, a second user has connected to the server computer. Again, one of the free virtual machines in the pool was assigned to the second user, and a new free virtual machine was added to the pool to maintain its number at 2. In this example, the server computer may be configured to maintain the number of free virtual machines in the pool to be the minimum of: a) the pool size; and b) the maximum number of concurrent users (i.e., 4) minus the number of currently active users. Thus, at time T4, after a third user has connected to the server computer and been assigned to one of the free virtual machines in the pool, the virtual machine assigned to the third user is not replaced with a new one, so that there is now only one virtual machine in the pool. Similarly, at time T5, the maximum number of 4 users has been reached, and there are now no free virtual machines in the pool.

Table 2 illustrates another example of an algorithm for maintaining the pool. In this example, the algorithm behaves similarly to the one described above with reference to Table 1 except that a minimum of at least one free virtual machine is kept in the pool at all times. Thus, even though the maximum number of 4 active users has been reached at time T5, there is still one free virtual machine in the pool. In various embodiments, the minimum number may be set to values other than 1.

Various embodiments of the algorithm may use different methods to reduce the number of free virtual machines in the pool as the number of currently active users nears the maximum number of concurrent users. For example, in Table 3 the algorithm behaves similarly as in Table 2, except that at time T4 when there are 3 active users, there is only one free virtual machine in the pool.

Table 4 illustrates another example where the number of free virtual machines in the pool is maintained at the pool size of 2 regardless of how many users are currently connected to the server computer.

When a user disconnects from the server computer, the virtual machine that the user was previously using is now free.

In some embodiments, this virtual machine may be added to the pool unconditionally in response to the user disconnecting. In other embodiments, the virtual machine may only be added to the pool if it would not result in the number of virtual machines in the pool becoming greater than the pool size N. In other embodiments, for example, the algorithm may allow the virtual machine to be added to the pool even if it would cause the number of virtual machines in the pool to become greater than the pool size N, unless the difference is more than a threshold maximum.

In some embodiments, if the server computer determines that the virtual machine from which the user disconnected should not be added to the pool then the virtual machine may be hibernated, e.g., by saving its state information to disk and suspending its execution. In other embodiments the virtual machine may be removed from the server computer altogether, e.g., may be completely de-allocated or un-instantiated from the server computer.

In one embodiment the server computer may be configured with a maximum number M of users that can connect to the server computer at one time. In some embodiments the server computer may ensure that the current number of users connected X plus the pool size N is not greater than the maximum number of users M. For example, suppose that the maximum number of users is 5 and the pool size is 2. If there are currently 3 or fewer users connected then the server computer may maintain a pool of 2 free virtual machines. However, if 3 users are connected and then a 4th user connects then the 4th user may be assigned to one of the free virtual machines in the pool, but the server computer may not create a new virtual machine to be added to the pool to replace the one that was assigned to the 4th user, since only one additional user can connect to the server computer and there is already one free virtual machine left in the pool.

As a further illustration of the pooling technique described above, consider an example in which a server computer is configured to have a maximum of 6 users. It would be possible to have no free virtual machines running on the server computer and instead to instantiate new virtual machines on demand, e.g., in response to users connecting to the server computer. However, this would require users to wait for a virtual machine to be started up before their connection is successful.

It would also be possible to have 6 virtual machines actively executing on the server computer at all times. For example, when no users are connected, all 6 of the virtual machines would be free; when 1 user is connected, one of the virtual machines would be assigned to the user and the other 5 would be free; etc. However, this may not be an efficient use of resources because each virtual machine uses some of the computer blade's computing resources (e.g., CPU power, memory, network bandwidth, etc.) even if the virtual machine is free.

Instead, a pool of free virtual machines may be maintained at a certain size, e.g., as described above. For example, suppose that the pool size is set to 1 via a Pool Size configuration value specified by an administrator. In this example, the number of virtual machines running at any given time on the server computer may equal the number of currently connected users plus 1 (except when the maximum number of users are connected). When a new user connects to the server computer, one of the virtual machines in the pool may be assigned to the user. Since the virtual machine was already instantiated and in an active execution state before the user connected, the user may be able to quickly connect to the server computer. The size of the free virtual machine pool may be maintained by instantiating a new virtual machine and adding it to the pool. When a user disconnects from the server computer, the number of free virtual machines (including the one that was just un-assigned from the user who disconnected) on the server computer may be examined. If the number of free virtual machines is greater than the Pool Size configuration value, the appropriate number of virtual machines may be hibernated to disk so that the number of free virtual machines once more equals the Pool Size configuration value.

As discussed above, the server computer system may include multiple server computers. An administrator of the server computer system may be able to utilize management software to set different pool sizes for different server computers. For example, an administrative graphical user interface of the management software may enable the administrator to set the pool size for each server computer as desired. In response to the user input from the administrator, the management software may communicate with each server computer to inform them of their respective pool sizes.

In some embodiments, the graphical user interface of the management software may allow the administrator to set a global Pool Size configuration value for all the server computers in the system. For example, the administrator may specify a system-wide pool size of 4 for all server computers. In other embodiments, different pool sizes may be set for different server computers. In one embodiment, the server computers may be grouped into two or more groups. For each group, the administrator may be able to specify a respective group pool size for all the server computers in a particular group. If a global pool size was set and a group pool size is also set then the group pool size may override the global pool size. In some embodiments the administrator may also be able to set pool sizes for individual server computers. If a global pool size or group pool size is set then the individual pool size specified for a particular server computer may override these global and group settings.

Dedicated Virtual Machines

In some embodiments, virtual machines may be used by multiple users. For example, suppose that a user A connects to a particular server computer of the server computer system, and a particular virtual machine is assigned to the user A. Once the user A is done, he may disconnect from the particular server computer. The particular virtual machine may then become available for use by other users. For example, if a user B subsequently connects to the particular server computer, the same virtual machine that user A was previously using may be assigned to the user B.

Figure 6A:
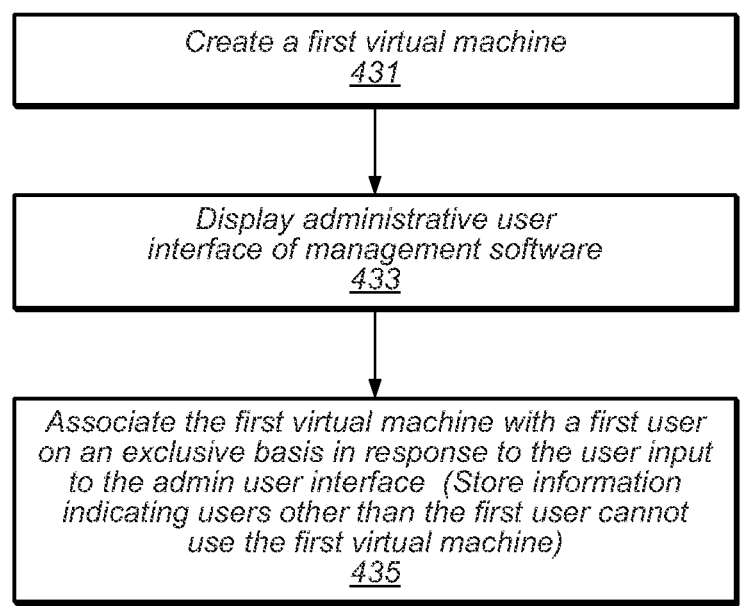
FIG. 6A is a flowchart diagram illustrating one embodiment of a method for associating a virtual machine with a user on an exclusive basis.

In other embodiments, it may be desirable to associate a particular virtual machine with a particular user on an exclusive basis, e.g., so that only the particular user can use the particular virtual machine. FIG. 6A is a flowchart diagram illustrating one embodiment of a method for associating a virtual machine with a user on an exclusive basis.

In block 431, a first virtual machine may be created on a particular server computer. For example, virtual machine hosting software executing on the particular server computer may create the first virtual machine.

In 433, an administrative user interface of management software for managing the server computer system may be displayed. The administrative user interface may enable an administrator to configure operation of the various server computers in the server computer system. In particular, the administrative user interface may enable the administrator to associate particular virtual machines with particular users on an exclusive basis. For example, the user interface may enable the administrator to select a particular server computer and view a list of virtual machines that have been created on the particular server computer. The user interface may also enable the administrator to select a first virtual machine from the list of virtual machines, select a first user from a plurality of users defined in the system, and request that the first virtual machine be associated with the first user on an exclusive basis.

As indicated in 435, in response to the administrator's user input to the user interface, the system may store information indicating that the first virtual machine is exclusively associated with the first user, e.g., indicating that users other than the first user cannot use the first virtual machine.

Figure 6B:
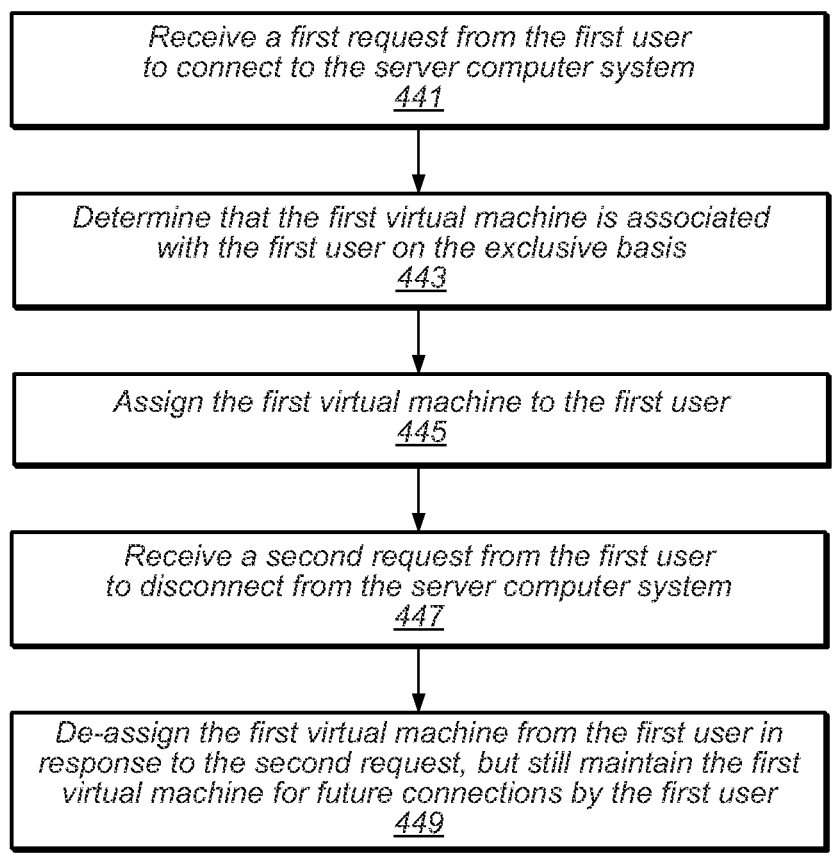
FIG. 6B is a flowchart diagram illustrating one embodiment of a method for assigning a particular virtual machine to a particular user after the virtual machine has been exclusively associated with the user.

FIG. 6B is a flowchart diagram illustrating one embodiment of a method for assigning the first virtual machine to the first user after the first virtual machine has been exclusively associated with the first user. As indicated in block 441, a first request from the first user to connect to the server computer system may be received. The system may determine that the first virtual machine is associated with the first user on the exclusive basis (e.g., by accessing the information stored in block 435) and assign the first virtual machine to the first user in response to the first request, as indicated in blocks 443 and 445. Assigning the first virtual machine to the first user enables the first user to communicate with and use the first virtual machine, e.g., through a remote communication session with the first user's client device.

In some embodiments, the first user's request to connect may be sent directly from the first user's client device to the server computer on which the first virtual machine is defined. In other embodiments, the request may be first sent to another server computer in the server computer system and then relayed to the server computer on which the first virtual machine is defined. For example, the server computer system may include a login server which is configured to receive connection requests and direct the requests to the appropriate server computers in the system. For example, the login server may access the stored information indicating that the first virtual machine is exclusively associated with the first user, and in response may direct the user's connection request to the server computer on which the first virtual machine executes.

Once the first virtual machine has been assigned to the first user, the first user can begin using the first virtual machine. For example, the user may execute software programs on the first virtual machine, access data stored on the first virtual machine, etc. Communication between the user's client device and the server computer on which the first virtual machine executes may be performed using any of various remote communication protocols or virtualization protocols, such as VNC, RDP, ICA, TDX, PCoIP, etc. When the user is finished using the first virtual machine, the user may request to disconnect from the server computer system, as indicated in block 447. In response to the user's request to disconnect, the first virtual machine may be de-assigned from the first user, e.g., where the de-assigning indicates that the first virtual machine is no longer in use by the first user. (It is noted that the first virtual machine remains exclusively associated with the first user even after the first virtual machine is de-assigned from the first user.)

However, in some embodiments the first virtual machine may not be removed from the server computer after the first virtual machine has been de-assigned from the first user. Instead, the server computer may continue to maintain the first virtual machine so that it is available for future connections by the first user. In some embodiments the server computer may maintain the first virtual machine in an active state of execution. In other embodiments, execution of the first virtual machine may be suspended, and the first virtual machine may be hibernated to disk.

Other users who connect to the server computer may be prevented from using the first virtual machine. For example, as noted above, when the first virtual machine is associated with the first user on the exclusive basis, the server computer system may store information indicating that only the first user can use the first virtual machine. Thus, if another user connects to the server computer, the other user may be assigned a virtual machine other than the first virtual machine that is exclusively associated with the first user.

In some embodiments, the first virtual machine may be maintained so that when the first user subsequently connects to it again, the first virtual machine is in the same state as it was when the first user previously disconnected. In some embodiments, when the first virtual machine is de-assigned from the first user, the first virtual machine may remain in an active state of execution on the server computer. For example, although the first virtual machine may be in an idle state, the first virtual machine may still be actively executed by the virtual machine host software. In other embodiments, when the first user is de-assigned from the first virtual machine, the first virtual machine may be hibernated so that it is no longer in an active state of execution.

Figure 6C:
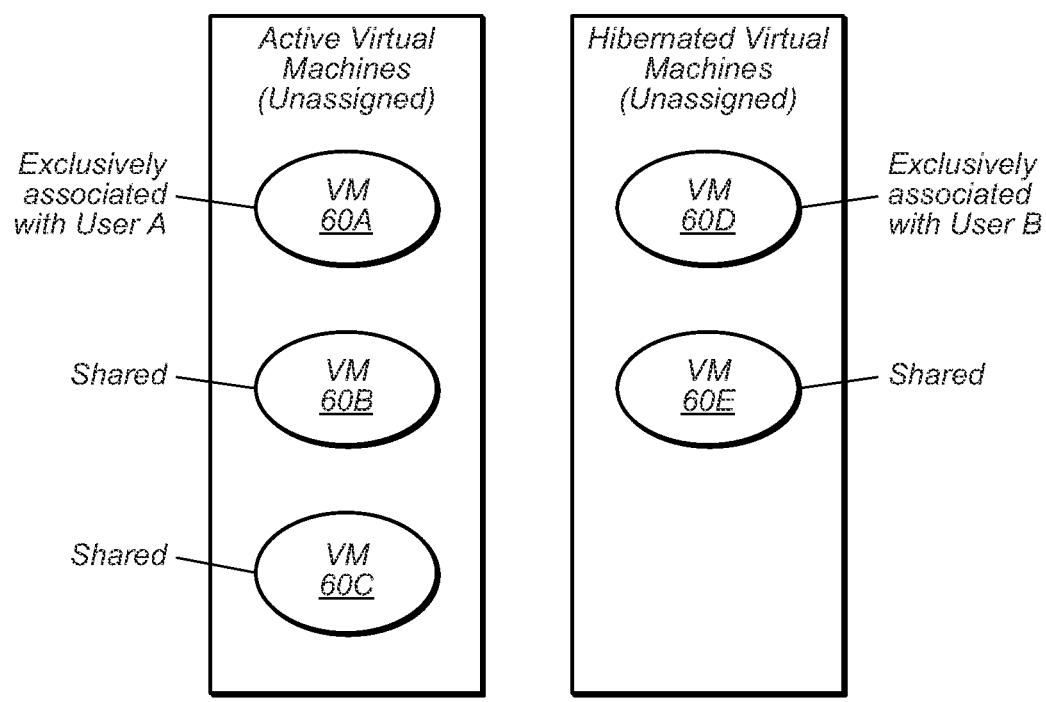
FIG. 6C is an example illustrating a plurality of virtual machines on a particular server computer in the server computer system.

FIG. 6C is an example illustrating a plurality of virtual machines (VMs) 60 on a particular server computer in the server computer system. The VMs 60 that are shown are those that are currently unassigned, i.e., currently not in use by any user. The VMs 60A, 60B, and 60C are in an active state of execution, and the VMs 60D and 60E are in a state of hibernation. In this example, the VM 60A has been associated with a User A on an exclusive basis, and the VM 60D has been associated with a User B on an exclusive basis. Thus, users other than the User A are prevented from using the VM 60A, and users other than the User B are prevented from using the VM 60B. The other VMs 60 are shared virtual machines that have not been exclusively assigned to any user and may be used by any user in the system.

In this example, the User A may have previously connected to and used the VM 60A. Although the User A subsequently disconnected from the VM 60A, the VM 60A remains in an active state of execution in this example. Thus, if the User A subsequently re-connects to the server computer system then the VM 60A may again be assigned to the User A, and the User A may not need to wait for it to be loaded since it is already in a state of active execution.

Suppose now that the server computer system receives a connect request from the User B. The system may access stored information to determine that the VM 60B is exclusively associated with the User B and may assign the VM 60B to the User B. However, since the VM 60B is in a state of hibernation, in some embodiments the User B may need to wait while the VM 60B is returned to a state of active execution. In other embodiments the system may receive user input from the User B indicating that it is permissible to assign a virtual machine other than the VM 60B to the User B. For example, in some embodiments a login screen may be displayed on the User B's client device when the User B logs in, where the login screen allows the User B to select an option specifying that if the User B's exclusive VM 60B is not currently loaded then it is acceptable to assign a different VM 60 to the User B. In other embodiments, after determining that the VM 60B is currently hibernated, the system may prompt the User B to specify whether he wants to wait while the VM 60B is loaded or wants another active VM 60 to be immediately assigned to him.

If the User B chooses to be assigned to a different VM 60 then the system may select one of the shared virtual machines that are currently unassigned and in an active state of execution, and assign the User B to the selected VM 60, e.g., either the VM 60B or 60C in this example.

It is possible that in some situations the virtual machine exclusively assigned to a particular user may not be currently loaded when the user attempts to connect to the system, and no other shared virtual machines may be available on the particular server computer which hosts the user's exclusive virtual machine. For example, the particular server computer may have already reached a maximum number of concurrent users allowed. In this situation the system may be operable to transfer the user's exclusive virtual machine to a different server computer in the server computer system, e.g., using techniques such as described below.

Consider an embodiment in which a particular server computer maintains a pool of free virtual machines of a particular pool size N, as described above. In some embodiments, when a user with an exclusive virtual machine disconnects from the server computer, the user's exclusive virtual machine may be hibernated to disk so that the number of free virtual machines does not exceed the configured pool size. Thus, if the user reconnects, the user may need to wait until the first virtual machine is retrieved from disk.

In other embodiments, an exclusive virtual machine (i.e., a virtual machine that is associated with a user on an exclusive basis) may not be counted in the total of free virtual machines in the pool. In other embodiments, an exclusive virtual machine may be counted in the total of free virtual machines in the pool, but the server computer may be configured to replace a non-exclusive (shared) virtual machine in the pool of free virtual machines with the exclusive virtual machine in response to a user of the exclusive virtual machine disconnecting from the server computer. In either of these embodiments, the exclusive virtual machine may be ready when the user re-connects so that the user does not have to wait for the exclusive virtual machine to be ready.

As noted above, the system may provide the user with a choice, e.g., via a graphical user interface, to either wait for his exclusive virtual machine to be loaded or to be assigned a shared virtual machine. However, the system preferably would not assign a user who has an exclusive virtual machine to a shared virtual machine without first receiving the user's approval.

In some embodiments, the system may support different classes of users, e.g., Exclusive users and Non-Exclusive users. Each user in the Exclusive class may be assigned a virtual machine on an exclusive basis when the user first connects to the system, whereas Non-Exclusive users are assigned to shared virtual machines on a non-exclusive basis.

Associating virtual machines with users on an exclusive basis may allow complete user-based isolation of applications and data stored on a virtual machine. Each user can be an exclusive owner of his virtual machine so that the user's virtual machine is never re-used by other users. In various embodiments, associating a virtual machine with a user on an exclusive basis may also ensure conditions such as:

A particular application license is only used by a particular user

Data stored on a particular virtual machine is in no way accessible to anyone else Personalization and Internet cache data as well as other privacy items are not accessible to any user other than the exclusively assigned user Any temporary files or other scratch space can in no way be accessed and reverse engineered for data theft Operating system features such as System Restore operate within the context of a single user (not multiple users making changes to the system in a way that makes System Restore unviable).

Physical Computer Assigned to User

As discussed above, in some embodiments of the server computer system, various server computers in the system may each execute one or more virtual machines. When a user connects to the server computer system, the user may be assigned one of the virtual machines for his use.

In other embodiments, instead of being assigned a virtual machine, the user may be assigned one of the physical server computers. For example, a given server computer in the system may not implement a virtualization platform that allows multiple users to use the server computer's resources. Instead, the entire physical server computer may be dedicated to a single user.

In some embodiments the physical server computers may be shared among different users. For example, one user may connect to the system and may be assigned a particular physical server computer. After finished using the physical server computer, this user may disconnect from the system. Another user may then connect to the system can be assigned the same physical server computer.

In other embodiments a physical server computer may be assigned to a single user on an exclusive basis, similarly as described above with respect to a virtual machine being assigned to a single user on an exclusive basis.

The server computer system may implement a connection broker which is operable to assign computers to users as they connect to the system. In some embodiments the connection broker may be operable to assign both virtual machines and physical computers to users. For example, the connection broker may use various criteria in order to decide whether to assign a user a virtual machine or a physical computer, and to decide which virtual machine or which physical computer to assign to the user. For example, the connection broker may base the decision on factors such as the currently available resources of the computers in the system and the geographic location of the user with respect to the computers.

The connection broker may also select a virtual machine or a physical computer to assign to a particular user in response to configuration information previously specified by an administrator. For example, an administrator of the server computer system may use an administrative user interface to specify an association of a particular virtual machine or a particular physical computer with a particular user. Information specifying the association may be stored in a database accessible by the connection broker. When the user attempts to log on to the system, the connection broker may access the information stored in the database in order to automatically determine which virtual machine or physical computer should be assigned to the user. Thus, the user may not need to inform the server computer system of the virtual machine or physical computer that is associated with the user, but instead, the system may automatically determine this based on the association information stored in the database. Thus, when the user logs on to the system, the user may not need to provide input specifying a particular virtual machine or physical computer to be assigned to the user.

Transferring Virtual Machines Across Server Computers

In some embodiments it may be desirable to transfer or move a virtual machine from one server computer in the server computer system to another server computer in the server computer system. For example, where the server computer system includes a blade computing system, it may be desirable to transfer a virtual machine executing on one computing blade 105 to another computing blade 105. As another example, where the server computer system includes a plurality of standalone server computers or PCs 82 connected via a network, it may be desirable to transfer a virtual machine executing on one server computer 82 to another server computer 82.

Figure 7A:
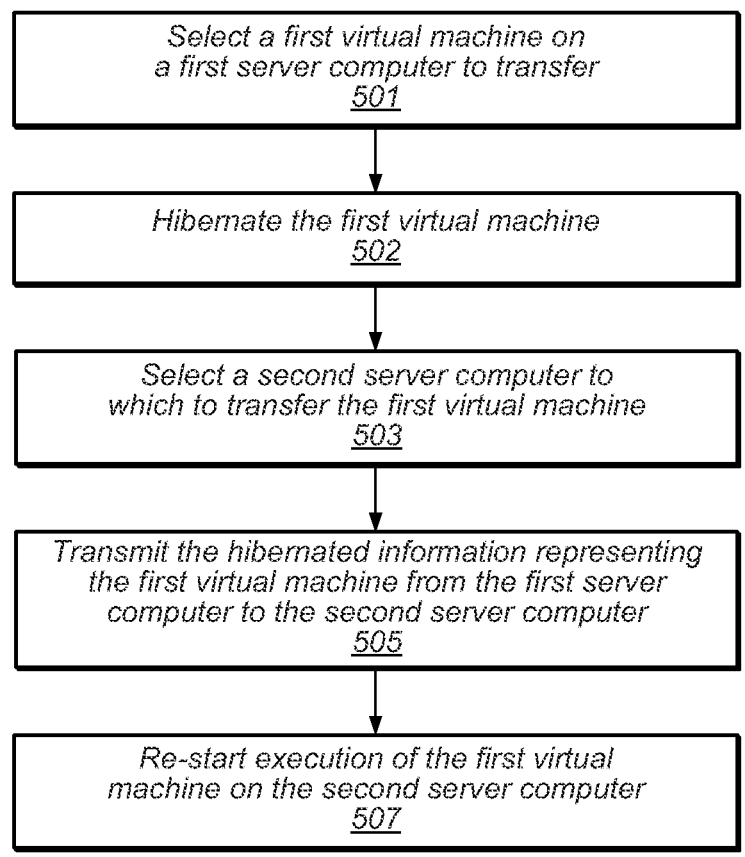
FIG. 7A is a flowchart diagram illustrating one embodiment of a method for transferring a virtual machine across server computers.

FIG. 7A is a flowchart diagram illustrating one embodiment of a method for transferring a virtual machine from one server computer to another.

In 501, a first virtual machine on a first server computer in the server computer system may be selected for transfer. In some embodiments the first virtual machine may currently be executing on the first server computer. In this case, the first virtual machine may be hibernated in response to being selected for transfer, as shown in block 502. Hibernating the first virtual machine may comprise pausing or suspending execution of the first virtual machine and storing state information representing the current state of the first virtual machine (e.g., state information representing the state of the first virtual machine as it exists the moment before it is paused or suspended). For example, the state information may be stored as one or more files on non-volatile storage, such as a disk drive of the first server computer, or other non-volatile storage in the server computer system.

The goal of hibernating the first virtual machine is to pause or suspend the execution of the first virtual machine without completely shutting down the first virtual machine. Thus, hibernating the first virtual machine may not include completely shutting down the first virtual machine. For example, when the first virtual machine is hibernated, a shutdown procedure that would typically be performed in order to completely shut down the first virtual machine may not be performed. Instead, the execution of the first virtual machine may be paused or suspended so that the first virtual machine is no longer in an active state of execution (e.g., no longer being actively executed within the virtualization environment), and the state information representing the current state of the first virtual machine may be stored.

When execution of a virtual machine is initiated, the virtual machine is typically instantiated from a virtual machine image file. For example, the virtualization environment that hosts the virtual machine may read the virtual machine image file from a disk drive and create information in RAM which represents the virtual machine in an active state of execution. The virtual machine image file may be constructed according to a particular virtual machine image format supported by a particular virtualization environment or particular virtual machine host software. In some embodiments, hibernating the first virtual machine may include creating a virtual machine image file representing the first virtual machine in its current state, or updating a virtual machine image file from which the first virtual machine was previously instantiated so that the virtual machine image file represents the current state of the first virtual machine as it exists at the time the first virtual machine is hibernated. In other embodiments, hibernating the first virtual machine may include storing state information representing the current state of the first virtual machine separately from the virtual machine image file from which the first virtual machine was previously instantiated.

In other embodiments, at the time the first virtual machine is selected for transfer in block 501, the first virtual machine may already be hibernated. In this case, the disk drive of the first server computer may already store state information representing the first virtual machine in its suspended state, and it may not be necessary to perform block 502.

In 503, a second server computer to which to transfer the first virtual machine may be selected. For example, in one embodiment the first server computer may be a first computer blade 105 installed in a chassis 113, and the second server computer may be a second computer blade 105 installed in the chassis 113. In another embodiment the second server computer may be a second computer blade 105 installed in a different chassis 113 from the first computer blade 105.

In another embodiment the first server computer may be a first standalone server computer or PC 82, and the second server computer may be a second standalone server computer or PC 82. In another embodiment the first server computer may be a first standalone server computer or PC 82, and the second server computer may be a computer blade 105 installed in a chassis 113, or vice versa.

As indicated in block 505, in some embodiments the hibernated information representing the first virtual machine may be transmitted from the first server computer to the second server computer. For example, transmitting the hibernated information may include transmitting a virtual machine image file representing the first virtual machine in its current state and/or transmitting other state information representing the first virtual machine.

In some embodiments, the hibernated information may initially be stored on a local disk drive or other storage device of the first server computer, and the hibernated information may be transmitted for storage on a local disk drive or storage device of the second server computer. In some embodiments the file system in which the hibernated information is stored on the first server computer may be accessible by the second server computer. For example, in some embodiments the first server computer and the second server computer may both be included in a local area network (LAN) such that both server computers have access to a common file system. As another example, the second server computer may be connected through a virtual private network (VPN) to the first server computer or to a LAN that includes the first server computer or that includes a storage device on which files for the first server computer are stored. Thus, in some embodiments the one or more files representing the hibernated information may be copied to the second server computer through a file system copy operation or a VPN copy operation.

In other embodiments the file system of the first server computer may not be accessible by the second server computer. For example, the second server computer may not be included in the LAN of the first server computer and may not be connected to the LAN through a VPN. Thus, the second server computer may not have file system access to the one or more files representing the hibernated information of the first virtual machine. In this case, the first server computer and the second server computer may communicate through a network in order to transfer the hibernated information representing the first virtual machine to the second server computer.

In some embodiments the second server computer may be connected to the first server computer through a wide area network (WAN) connection, and/or the second server computer may be separated from the first server computer by one or more firewalls. In this case, the first server computer and the second server computer may communicate using a communication protocol that enables the hibernated information to be transferred from the first server computer to the second server computer through the WAN connection and/or through the one or more firewalls. For example, in some embodiments the first server computer and the second server computer may communicate using a common communication protocol, such as HTTP, HTTPS, or FTP to transmit the hibernated information of the first virtual machine to the second server computer.

In other embodiments, when the first virtual machine is hibernated in block 502, the hibernated information representing the first virtual machine may be stored on a storage device accessible by both the first server computer and the second server computer, such as a network attached storage (NAS) or storage area network (SAN). In this case, it may not be necessary to perform block 505, since the second server computer can access the hibernated information from the NAS or SAN.

As indicated in block 507, after the hibernated information representing the first virtual machine has been transmitted to the second server computer, the second server computer may begin executing the first virtual machine, e.g., under control of a virtualization environment or virtual host software. For example, the first virtual machine may be instantiated on the second server computer using the virtual machine image file and/or the other state information representing the first virtual machine transmitted in block 505. As noted above, the hibernated information includes state information representing the state of the first virtual machine as it existed on the first server computer the moment before it was hibernated. Thus, the state information may be used to set the first virtual machine on the second server computer into an identical state as it existed on the first server computer or to re-create an execution state of the first virtual machine on the second server computer such that the execution state is identical to how it was on the first server computer.

Since the first virtual machine was not completely shut down on the first server computer when it was hibernated, it may not be necessary to perform a complete startup procedure for the first virtual machine on the second server computer. Instead, the first virtual machine may simply be removed from its state of hibernation and returned to an active state of execution under control of the virtualization environment on the second server computer. This may enable execution of the first virtual machine on the second server computer to begin quickly and may enable the preservation of the state of the first virtual machine.

In some embodiments, the method described above may be performed in response to receiving a request to move execution of the first virtual machine from the first server computer to the second server computer. For example, the first virtual machine may be in an active state of execution on the first server computer, and a user at a remote client computer may have a first remote communication session open to the first virtual machine on the first server computer. In one embodiment, an administrator of the server computer system may utilize an administrative user interface in order to request that execution of the first virtual machine be transferred to the second server computer. In response, the first virtual machine may be transferred to the second server computer, and the second server computer may resume execution of the first virtual machine, as described above.

In this example, the first remote communication session between the user at a remote client computer and the first server computer may be automatically replaced with a second remote communication session between the remote client computer and the second server computer. Once the second server computer has begun executing the first virtual machine and the second remote communication session has been established, the user may interact with the first virtual machine just as the user was doing previously, except that now the communication with the first virtual machine occurs between the user's client computer and the second server computer instead of between the user's client computer and the first server computer. In some embodiments, the first virtual machine may appear to the user to be exactly the same as before it was transferred to the second server computer, and the user may not notice a difference in the first virtual machine regardless of which server computer executes the first virtual machine.

In some embodiments the transfer of the first virtual machine may be transparent to or unnoticed by the user of the remote client computer. For example, in some embodiments the user may not be aware of the transfer. In other embodiments the user may notice a delay as the transfer takes place, or the server computer system may communicate with the client software on the remote client computer to cause the client software to display information informing the user that the transfer is taking place and to expect a delay as it occurs.

In other embodiments, the user himself may initiate the transfer of the first virtual machine from the first server computer to the second server computer. For example, in some embodiments the client software on the remote client computer may include a feature that enables the user to request that the first virtual machine which he is using be transferred to a different server computer. For example, if the user is experiencing an unusual delay in the communication with the first virtual machine and believes that the delay may be caused by network latency between the client computer and the first server computer, or if the user believes that the delay may be caused by the first server computer being overloaded, then the user may request that his first virtual machine be transferred to a different server computer. In response, the server computer system may transfer the first virtual machine to the second server computer, as described above.

Alternatively, in another embodiment, the user may use a feature of the client software in order to inform an administrator of the server computer system that the user is experiencing poor performance. In response to receiving the notification, the administrator may use an administrative user interface provided by management software for the server computer system in order to view server computers present in the system and to select a different server computer to which the first virtual machine should be transferred. For example, the administrative user interface may display information indicating resource usage and performance statistics of the various server computers in the system, and the administrator may select the second server computer to which to move the first virtual machine based on its resource usage, e.g., may select a server computer that appears to have ample free memory, available processor power, available network bandwidth, or other free resources which may improve the user's experience.

In another embodiment, the administrative user interface may display information indicating network locations or geographic locations of the various server computers in the server computer system, and the administrator may select the second server computer to which to move the first virtual machine based on its location. For example, the administrator may select a second server computer which is geographically closer to the user's client computer than the first server computer.

Alternatively, in some embodiments, the server computer system may be configured to automatically keep track of resource usage and performance statistics of the various server computers in the system and may automatically move various virtual machines between server computers in order to load balance the system. In other embodiments the server computer system may be configured to automatically keep track of network latency experienced by the user, and may automatically move the user's virtual machine to a different server computer if the system detects that the user is experiencing an unusually slow network latency. In other embodiments the server computer system may automatically transfer the user's virtual machine to a different server computer if the system detects that the first server computer is overloaded, e.g., if its memory, disk space, processor power, network bandwidth, or other resources are running low. In other embodiments the server computer system may be configured to automatically determine the geographical proximity between the user's client computer and the first server computer that initially hosts the user's virtual machine, and may automatically move the user's virtual machine to the second server computer if the system determines that the second server computer is closer to the user's client computer.

Thus, in some embodiments, the first virtual machine may be actively executing on the first server computer, and the method described above may be performed in order move the first virtual machine to the second server computer. Once the first virtual machine has been transferred, its execution may be automatically resumed on the second server computer.

In other embodiments, the first virtual machine may not be actively executing on the first server computer before being moved to the second server computer, but may instead be in a state of hibernation on the first server computer. In this case, when the first virtual machine has been transferred to the second server computer, the second server computer may not automatically begin executing the first virtual machine. Instead, the first virtual machine may remain in a state of hibernation on the second server computer until subsequently being returned to active execution in response to a subsequent event, such as a request to re-activate the first virtual machine being received.

Transfer Across Different Virtualization Platforms

As described above, various server computers in the server computer system may execute virtualization environment software (also referred to herein as a hypervisor, or virtual machine host software, or virtualization platform). The virtualization environment software executing on a particular server computer may implement a virtual machine execution environment so that one or more virtual machines can be created and executed within the virtual machine execution environment on the particular server computer.

In various embodiments each server computer in the server computer system may execute any type of virtualization environment software. Many different implementations of virtualization environments are commercially available from various software vendor companies. One example of a virtualization environment software platform that may be executed by a server computer in the server computer system is Microsoft Virtual Server by Microsoft Corp. Other examples include ESX Server, Virtual Server, Workstation, and ACE by VMWare, Inc. It is noted that these are listed as examples only, and in other embodiments, the server computers and the server computer system may execute any of various other kinds of virtualization environment software platforms provided by or sold by any of various other organizations or software vendors.

In some embodiments, different server computers in the server computer system may execute different types of virtualization platforms. For example, in some embodiments one or more of the server computers may execute the VMWare ESX Server virtualization platform, and one or more other server computers may execute a different VMWare virtualization platform, such as Workstation or ACE. As another example, in some embodiments one or more of the server computers may execute the VMWare ESX Server virtualization platform, and one or more other server computers may execute the Microsoft Virtual Server virtualization platform.

Virtual machines for different virtualization platforms may not be compatible with each other. For example, a virtual machine image format used by one virtualization platform may not be supported by another virtualization platform. For example, the VMWare ESX Server virtualization platform typically cannot execute a virtual machine created by the Microsoft Virtual Server virtualization platform, and vice versa.

Thus, in some embodiments, in order to move a virtual machine from a first server computer to a second server computer that uses a different virtualization platform, it may be necessary to use techniques other than transferring the virtual machine image file used by the first server computer to the second server computer, and the second server computer instantiating the virtual machine from the virtual machine image file. Instead, in these cases, the alternative method illustrated in FIG. 7B may be used in order to move execution of a virtual machine from the first server computer to the second server computer.

For example, suppose that a first virtual machine 60A executing within a first virtualization platform 63A on a first server computer 82A needs to be moved to a second server computer 82B. As indicated in block 517 of FIG. 7B, snapshot information 64 for the first virtual machine 60A may be created. The snapshot information 64 represents the state of the first virtual machine 60A. In various embodiments, the snapshot information 64 may include any of various types of information representing the state of the first virtual machine 60A.

Figure 7B:
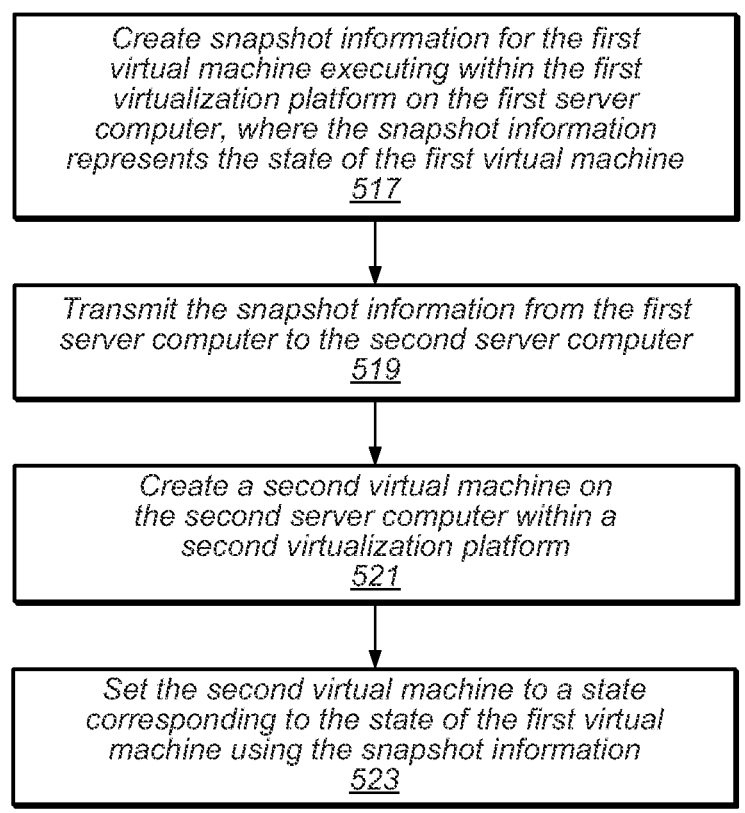
FIG. 7B is a flowchart diagram illustrating one embodiment of a method for moving execution of a virtual machine from a first server computer that implements one type of virtualization platform to a second server computer that implements a different type of virtualization platform.
Figure 7C:
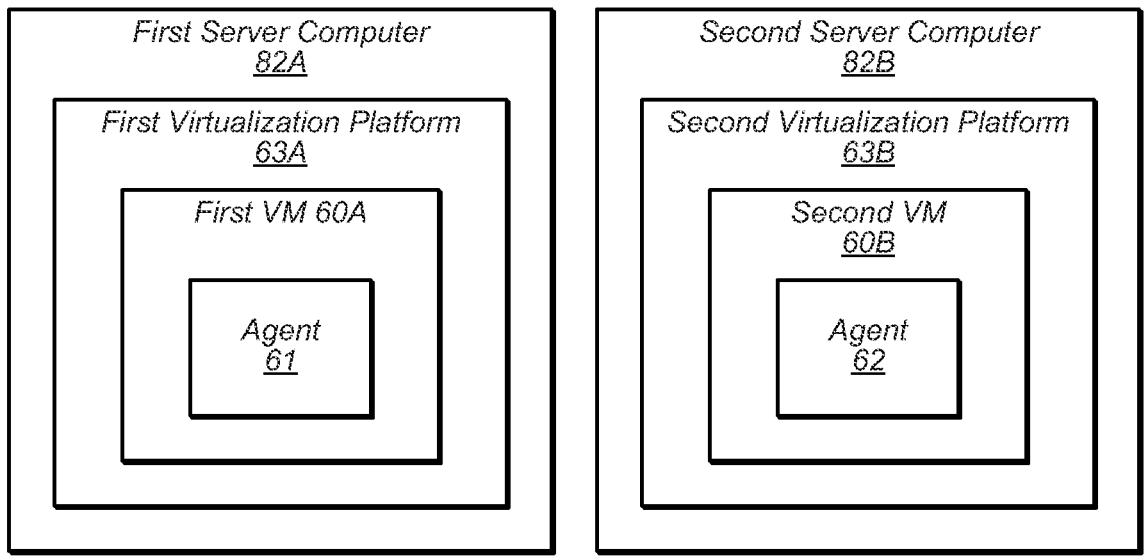
FIG. 7C illustrates an example of a system which may implement the method of FIG. 7B, according to one embodiment.
Figure 7D:
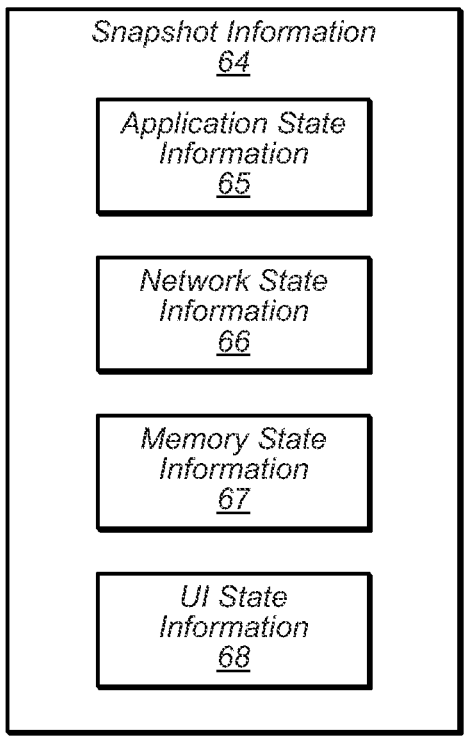
FIG. 7D illustrates an example of snapshot information used in the method of FIG. 7B.

For example, FIG. 7D illustrates an example where the snapshot information 64 includes application state information 65. At the time the snapshot information 64 is created, one or more software applications may currently be executing on the first virtual machine 60A. The application state information 65 may include information representing the execution state of each of these software applications executing on the first virtual machine 60A. For example, suppose that a first software application is executing on the first virtual machine 60A. The application state information 65 may include information indicating program instructions and data for the first software application currently stored in the memory of the first virtual machine 60A.

As another example, the snapshot information 64 may include memory state information 67. The memory state information 67 may represent the dynamic memory contents of the first virtual machine 60A as the contents exist at the time the snapshot information 64 is created.

As another example, the snapshot information 64 may include network state information 66. The network state information 66 may represent the states of network connections that are currently open by the first virtual machine 60A at the time the snapshot information 64 is created, or other information representing network communication performed by the first virtual machine 60A.

As another example, the snapshot information 64 may include user interface state information 68. The user interface state information 68 may include information representing a state of the user interface implemented by the first virtual machine 60A. For example, at the time the snapshot information 64 is created, a user of a remote client computer may have a remote communication session opened to the first virtual machine 60A. Through the remote communication session, the first virtual machine 60A may display one or more graphical user interface windows on the display of the remote client computer. The user interface state information 68 may include information representing the state of each graphical user interface window. For example, suppose that a first graphical user interface window is currently displayed on the client computer. The user interface state information 68 may include information regarding the first graphical user interface window, such as information indicating whether the window is maximized or minimized, the size of the window, the position of the window on the display, etc.

In some embodiments, execution of the first virtual machine 60A may be paused just prior to creating the snapshot information 64. This may enable the entire state of the first virtual machine 60A to be captured in the snapshot information 64 in a consistent manner, e.g., without the state of the first virtual machine 60A changing while the snapshot information 64 is being created.

As indicated in block 519, the snapshot information may be transmitted from the first server computer to the second server computer. In some embodiments, the virtual machine image file for the first virtual machine 60A may not be transmitted to the second server computer. For example, the snapshot information created in block 517 may be stored on the first server computer 82A separately from the virtual machine image file and transmitted separately to the second server computer 82B. However, similar techniques as described above for transmitting the virtual machine image file in the method of FIG. 7A may be used to transmit the snapshot information to the second server computer 82B. For example, in some embodiments the second server computer 82B may be connected to the first server computer 82A through a wide area network (WAN) connection, e.g., through the Internet. A common communication protocol such as HTTP, HTTPS, or FTP may be used to transmit the snapshot information without requiring the second server computer 82B to be connected to the first server computer 82A through a LAN or VPN.

After the snapshot information has been transmitted to the second server computer 82B, a second virtual machine 60B may be created on the second server computer 82B within a second virtualization platform 63B, and the state of the second virtual machine 60B may be set using the snapshot information, as indicated in blocks 521 and 523. As discussed above, the second virtualization platform 63B may be a different type than the first virtualization platform 63A on the first server computer 82A. Thus, the second virtual machine 60B may not be created from the virtual machine image file that implements the first virtual machine 60A on the first server computer 82A. Instead, the second virtual machine 60B may be created by the second virtualization platform 63B as a different type of virtual machine (i.e., a virtual machine supported by the second virtualization platform 63B), and then the state of the second virtual machine 60B may be set so that it appears to the user to be the same as the first virtual machine 60A. The remote communication session that was previously open between the user's client computer and the first server computer 82A may be replaced by a new remote communication session between the user's client computer and the second server computer 82B.

Since the state of the second virtual machine 60B is set using the snapshot information 64, it may appear to the user that he is still using the same virtual machine as before. In some embodiments, the user may not be aware that his virtual machine was moved to the second server computer 82B, and may not be aware that the virtual machine has been re-created in a different virtualization platform.

For example, as noted above, the snapshot information 64 may include application state information 65 representing the execution state of a first software application that was executing on the first virtual machine 60A when the snapshot information 64 was created. Thus, setting the state of the second virtual machine 60B in block 523 may include initiating execution of the first software application on the second virtual machine and setting the execution state of the first software application on the second virtual machine to the state specified by the application state information 65. Thus, the user may see the same open software applications on the second virtual machine and may continue to interact with the open software applications just as he was previously doing on the first virtual machine.

As another example, setting the state of the second virtual machine 60B in block 523 may include storing the memory contents, e.g., program instructions and data, there were stored in the dynamic memory of the first virtual machine 60A in the dynamic memory of the second virtual machine 60B, using the memory state information 67.

As another example, setting the state of the second virtual machine 60B in block 523 may include setting the network communication state of the second virtual machine 60B using the network state information 66. For example, if the first virtual machine 60A had a network connection open with a particular server computer then a corresponding network connection to the particular server computer may be opened on the second virtual machine 60B.

As another example, setting the state of the second virtual machine 60B in block 523 may include setting the user interface state of the second virtual machine 60B using the user interface state information 68. For example, if a graphical user interface window was open on the user interface of the first virtual machine 60A then an identical corresponding graphical user interface window may be opened on the user interface of the second virtual machine 60B and positioned in the same place on the display.

FIG. 7C illustrates an example of a system which may implement the method of FIG. 7B according to one embodiment. The first server computer 82A executes software implementing a first virtualization platform 63A. The first virtual machine 60A executes within the first virtualization platform 63A. In this example, the first virtual machine 60A includes a software agent 61. The software agent 61 may be a software program that executes on the first virtual machine 60A to create the snapshot information, as discussed above with reference to block 517. For example, the software agent 61 may analyze the contents of the first virtual machine 60A's memory or other information maintained by the first virtual machine 60A in order to create the snapshot information representing the state of the first virtual machine 60A. In other embodiments, the software that creates the snapshot information 64 in block 517 may not execute within the first virtual machine 60A itself. For example, in some embodiments the snapshot information 64 may be created by the first virtualization platform 63A, or another software program executing under control of the first virtualization platform 63A.

The second server computer 82B executes software implementing a second virtualization platform 63B. The second virtual machine 60B executes within the second virtualization platform 63B. In this example, the second virtual machine 60B includes a software agent 62. The software agent 62 may be a software program that executes on the second virtual machine 60B in order to set the state of the second virtual machine 60B using the snapshot information 64, as discussed above with reference to block 523. For example, the software agent 62 may analyze the snapshot information 64 and use the snapshot information 64 to set the contents of the second virtual machine 60B's memory or set other configuration or state information for the second virtual machine 60B, e.g., in order to configure the state of a second virtual machine 60B as described above.

In some embodiments an administrator may actively cause the execution of the virtual machine to be moved. For example, in some embodiments the method of FIG. 7B may be performed in response to user input by the administrator. The administrator may communicate with management software through an administrative graphical user interface. For example, the graphical user interface may display a list of server computers in the server computer system. The administrator may select the first server computer from the displayed list. In response, the management software may display a list of all virtual machines on the first server computer. The administrator may select the first virtual machine from the displayed list. Similarly, the administrator may also interact with the administrative graphical user interface to select the second server computer to which the transfer the first virtual machine (or the second server computer on which a virtual machine corresponding to the first virtual machine should be created).

In other embodiments execution of the first virtual machine may automatically be transferred from the first server computer to the second server computer, e.g., may be transferred without an administrator requesting the transfer. For example, the system management software 10 may cause virtual machines to be automatically transferred across server computers in order to increase the efficiency of resource utilization of server computers in the server computer system.

Consider an example in which an organization has a system that includes a first server computer at a location in California and a second server computer at a location in Japan. An employee E may be based at the location in California but may travel to Japan. The employee E may log into a thin client end user console 80 at the Japan location, and the system may assign a virtual machine to him. The system may store information indicating that he is normally based in California and may assign a virtual machine hosted by the server computer at the California location to him. As another example, an exclusive virtual machine may be assigned to him, where the exclusive virtual machine is hosted by the server computer at the California location.

However, since the employee E is currently located in Japan, it may be more efficient if the virtual machine assigned to him were hosted by the server computer at the Japan location. With the transfer capability described above, an administrator or an automated algorithm may allow the virtual machine assigned to the user to be moved from the California location to the Japan location.

In other embodiments, additional variables may be considered, such as ensuring that the virtual machine is close to a database server, if the user needs to execute a database intensive application. Thus, in various embodiments, virtual machines may be moved across server computers in the system for any of various reasons, such as security, speed, efficiency or cost (e.g. minimizing expensive bandwidth) reasons.

Auto-Hibernation of Inactive Virtual Machines

Figure 8:
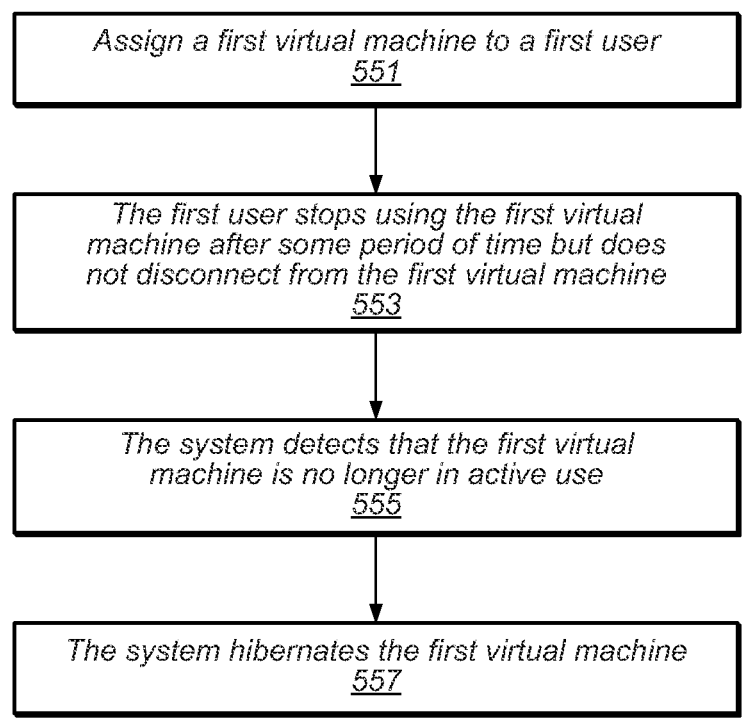
FIG. 8 is a flowchart diagram illustrating one embodiment of a method for automatically hibernating an inactive virtual machine.

In some embodiments, an end user may stop using the system but may not disconnect or log out from the system. If the user's virtual machine continues to execute, this may cause CPU power, memory, or other computing resources to be used unnecessarily. FIG. 8 is a flowchart diagram illustrating one embodiment of a method for automatically hibernating an inactive virtual machine.

As indicated in 551, a first virtual machine may be assigned to a first user, e.g., in response to the user logging in to the system.

As indicated in 553, the first user may stop using the first virtual machine after some period of time but may not disconnect from the first virtual machine. For example, the user may forget to log out of the system or may be called to another task.

As indicated in 555, the system may detect that the first virtual machine assigned to the first user is no longer in active use. For example, the system may determine that no user input has been received from peripheral devices at the first user's console for a threshold period of time or may use other techniques to determine that the first virtual machine is not actively being used. In various embodiments, any of various algorithms or heuristics may be used to determine whether the first virtual machine is in active use. The threshold time period or other factors used to determine inactivity may be configured in response to user input by an administrator.

As indicated in 557, in response to determining that the first virtual machine is not in active use, the system may cause the first virtual machine to be automatically hibernated. Hibernating the first virtual machine may free computing resources used by the first virtual machine so that they are available for use by active virtual machines.

In some embodiments, each user may be assigned a configuration variable that specifies whether the user is allowed to run disconnected virtual machines. A numeric value associated with the configuration variable may specify the number of simultaneous, disconnected virtual machines the user is allowed to run. For example, if a user has a value of 3 associated to him, the first 3 virtual machine sessions he creates and then disconnects will continue to run. If he runs a fourth session and disconnects then the fourth virtual machine may be automatically hibernated after an inactivity period.

Client-Side Execution

As described above, in some embodiments of the system, a user of a client computer may connect to a server computer on which a virtual machine is stored. The virtual machine may execute on the server computer under control of virtual machine host software (e.g., a hypervisor), and the client computer may provide input to the virtual machine and display output from the virtual machine using a communication protocol which enables communication between the client computer and the remote virtual machine.

In other embodiments it may be desirable to execute a virtual machine locally on a user's client computer. For example, in some embodiments the client computer may execute client software that includes a hypervisor or virtual machine host software which enables a virtual machine to be executed on the client computer.

A virtual machine is typically implemented using a virtual machine image file. In order to execute the virtual machine, the hypervisor or virtual machine host software on the client computer needs to access the image file. However, the virtual machine image file may be stored on the server computer system such that the client computer system does not have file-level access to the virtual machine image file. For example, in some embodiments the client computer system may be a remote computer system that is not part of the server computer system's local network. The client computer system may not be able to join the server computer system's network in a way that provides the client computer system with direct access to files stored on the server computer system.

To overcome this problem, in some embodiments of the system and method, the server computer system may provide access to the virtual machine image file through standard communication protocols such as HTTP, HTTPS, or FTP in order to allow the client computer system to retrieve the virtual machine image file over a network. The use of such a standard communication protocol may enable the client computer system to obtain the virtual image file without joining the server computer system's network through a VPN, and may enable the file transfer to traverse firewalls. Once the virtual machine image file has been obtained, the client computer system can execute it locally, e.g., under control of a hypervisor or virtual machine host software.

Figure 9:
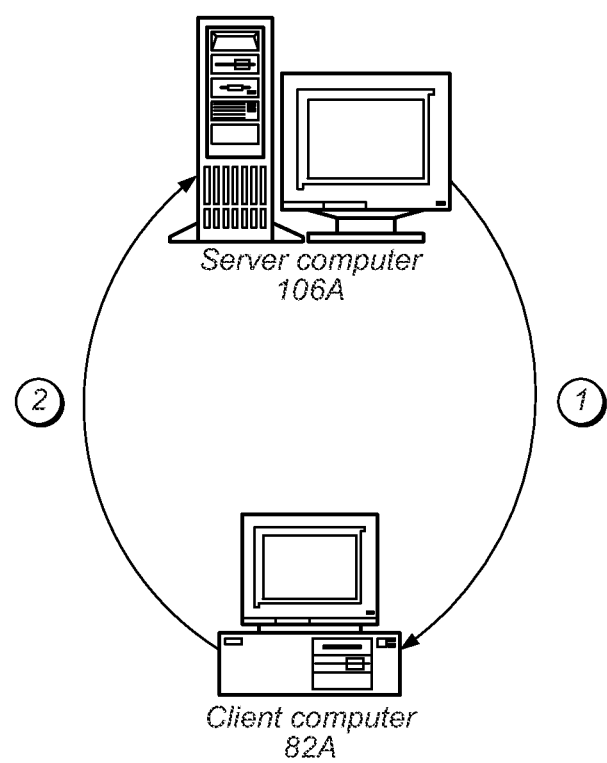
FIG. 9 illustrates an example of transferring a virtual machine from a server computer to a client computer and back again.

FIG. 9 illustrates an example in which a client computer system 82A executes client software that is capable of performing a communication protocol such as HTTP, HTTPS, or FTP. As indicated by the arrow 1, the client software may communicate with server-side software executing on a server computer 106A in order to retrieve the virtual machine image file from the server computer 106A.

In some embodiments the client software that retrieves the virtual machine image file may be embedded within a standard web browser program, such as Firefox or Internet Explorer. For example, the client software may be embedded in the web browser as a browser plug-in or ActiveX, Flash, AJAX or other dynamic control within the web browser. In this embodiment the user may simply enter a URL of the server computer system in the web browser in order to access a web page. The web page may include input fields allowing the user to input authentication information, such as a username and password or other information. Upon successfully authenticating the user, the server computer system may return another web page to the web browser which allows the user to select a desired virtual machine to be retrieved to the client computer. For example, in some embodiments the user may be presented with a list of available virtual machines that are associated with the user or to which the user has access. In other embodiments the virtual machine to be retrieved by the user may be predetermined, e.g., may have been configured by an administrator of the server computer system.

Once the determination of which virtual machine to retrieve has been made (either by the user selecting a desired virtual machine or by identifying a predetermined virtual machine for the user) the image file for the virtual machine may be streamed from the server computer 106A to the client computer 82A, e.g., using a standard protocol supported by the web browser such as HTTP, HTTPS, or FTP. As noted above, these protocols typically do not require a VPN tunnel to exist between the client computer 82A and the server computer 106A.

Once the client computer has received the virtual machine image file, it may instantiate the virtual machine and begin executing it, e.g., under control of a hypervisor. In some embodiments the hypervisor may be embedded in the web browser which the user uses to access the server computer and select the virtual machine image file.

In some embodiments the user of the client computer 82A may have previously connected to the server computer system and retrieved a full copy of the virtual machine image file. In some embodiments, if the client computer 82A subsequently reconnects to the server computer system, the system may utilize file differencing techniques so that only portions of the virtual machine image file that have changed since the previous transfer need to be transmitted to the client computer 82A. For example, the client computer 82A may communicate with the server computer 106A on which the virtual machine image file is stored in order to perform an initial transfer of the entire virtual machine image to the client computer 82A.

The virtual machine may then be executed on the client computer 82A. If any changes to the virtual machine are made then it may be desirable to update the copy of the virtual machine image file on the server computer 106A, as indicated by arrow 2 in FIG. 9. Instead of transferring the entire virtual machine image file back to the server computer 106A, only the changed portions of the virtual machine image file may be transmitted. Thus, the file differencing techniques may be employed in both directions, either when transferring the virtual machine from the server computer 106A to the client computer 82A or vice versa.

In some embodiments the client software on the client computer 82A may include a feature that enables the user to select whether to execute a virtual machine locally on the client computer 82A or remotely on the server computer 106A and manages the virtual machine session and execution. For example, this feature may be exposed to the user as a simple button.

Figure 10:
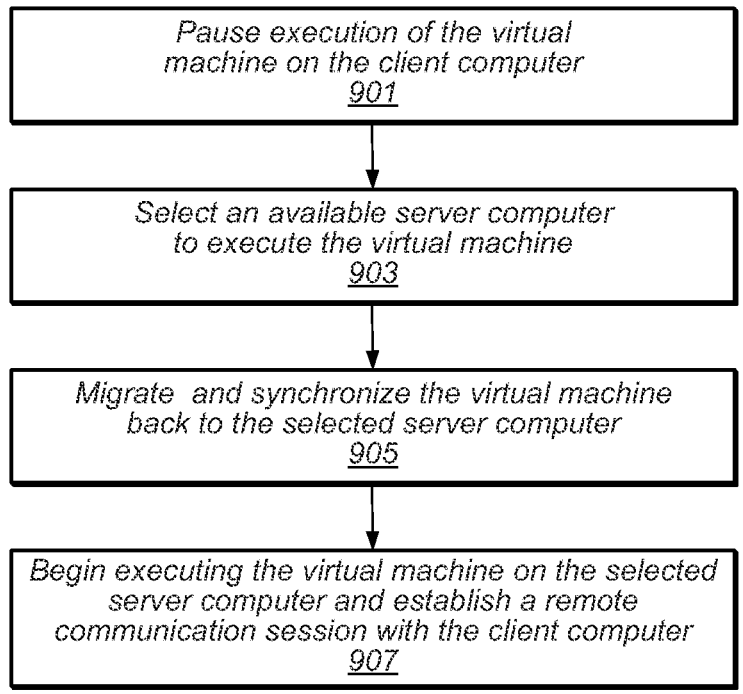
FIG. 10 is a flowchart diagram illustrating one embodiment of a method for dynamically transferring local execution of a virtual machine from a client computer to remote execution on a server computer.

Assume that by default the system administrator has configured the virtual machine to be downloaded to the client and executed locally. While the virtual machine is executing on the client computer 82A, the user may click the "Run at Server" button. In response, the execution of the virtual machine may be paused, as indicated in block 901 of FIG. 10. As indicated in block 903, an available server computer in the server computer system may be selected to execute the virtual machine. The virtual machine image file on the client computer may be migrated to the selected server computer and synchronized with the copy of the virtual machine image file already stored on the server computer system, as indicated in block 905. As described above, only the changed portions of the virtual machine image file need to be transferred across the network. The selected server computer may then begin executing the virtual machine and may establish a remote communication session with the client computer to enable the user to interact with the virtual machine remotely, e.g., through a remote communication protocol such as VNC, RDP, ICA, TDX, PCoIP, etc. Once the remote communication session has been established, the user may see the same virtual machine that was previously executing locally on the client computer 82A. For example, the user interface implemented by the virtual machine may appear on the display of the client computer 82A identically to (or very similar to) how it appeared before the virtual machine was migrated to the server computer system, with the same applications and user interface windows open, etc.

Figure 11:
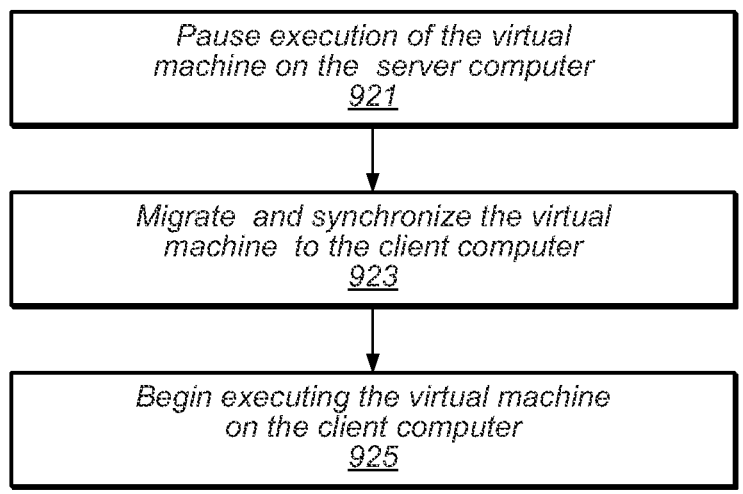
FIG. 11 is a flowchart diagram illustrating one embodiment of a method for dynamically transferring remote execution of a virtual machine on a server computer to local execution on a client computer.

The "Run at client" feature is the inverse of the above functionality. Suppose that a virtual machine is currently executing on the server computer 106A. The user may then click the "Run at client" button in the client software on the client computer 82A. As indicated in block 921 of FIG. 11, the execution of the virtual machine on the server computer 106A may be paused. The virtual machine may then be migrated to the client computer 82A, as indicated in block 923. If a previous version of the virtual machine is already stored on the client computer 82A, then the current version of the virtual machine may be synchronized with the previous version by transferring only the changed portions of the virtual machine image, as described above. The client computer 82A may then begin executing the virtual machine, as indicated in block 925. For example, the client computer 82A may include a hypervisor or virtual machine host software operable to execute the virtual machine.

In some embodiments a virtual machine image file that has been transferred from the server computer system to the client computer may be encrypted. Encrypting the virtual machine image file may increase the security of the information in the virtual machine.

In some embodiments the client software may allow the user to specify various options affecting storage of a virtual machine image file that has been downloaded to the client computer. For example, the user may be able to specify that the virtual machine image file should be completely deleted from the client computer after the user's session with the virtual machine is finished. As another example, the user may be able to specify that the virtual machine image file should continue to be stored locally on the client computer, which may enable the amount of time required to synchronize with the most recent copy of the virtual machine to be reduced upon subsequent usage, as described above.

In some embodiments an administrator of the server computer system may be able override the user's configuration choices. For example, even if the user has configured virtual machine image files to persist on the local client computer, the administrator may set a server-side flag which causes the server computer to instruct the client software to always delete any downloaded virtual machines, or to delete particular virtual machines that have been downloaded.

In some embodiments and expiry date may be associated with a virtual machine that has been downloaded to and locally stored on the client computer. Once the expiry date of the virtual machine has been reached, the client software may automatically delete the virtual machine. In some embodiments the client software may use the time maintained by the server computer system clock in order to determine whether the expiry date has been reached, rather than using the local client computer system clock.

As described above, the client computer may execute client software that provides capabilities to authenticate the user to the server computer system, download a virtual machine image file from the server computer system, and execute the virtual machine on the client computer, e.g., (through an embedded hypervisor). The client software may also be configured to contact the server computer system when it starts and query for any commands that should be executed by the client software. As one example, the server computer system may command the client software to delete or purge a specific virtual machine stored locally on the client computer, or to delete or purge all locally stored virtual machines. As another example, the server computer system may command the client software to set a new expiry date for one or more of the virtual machines locally stored on the client computer. As another example, the server computer system may command the client software to download and install an update for the client software on the client computer. Even if the client software is not able to contact the server computer system, the client software may still use the previously configured expiry dates for all locally stored virtual machines and still purge the virtual machines if they have expired.

Further Embodiments

The following describes various more detailed embodiments regarding the capture and recapitulation or restoration of machine state, e.g., the state of a virtual machine (VM) or a physical machine, e.g., the state of a client session. It should be noted that the particular devices, products, file types, and functions mentioned are meant to be exemplary only, and are not intended to limit the techniques to any particular set of devices, products, file types, or functions. It should be further noted that the state capture/restoration methods disclosed herein are quite different from prior art memory image based techniques, at least because in the present approach, not only is the end state (i.e., the state of the system at the time of capture) stored using metadata and without using memory images, but for each aspect, e.g., application, process, etc., the steps or actions that led to the end state are also captured. Thus, rather than copying and reinstating a memory image, embodiments of the present technique save and recapitulate the steps that resulted in the end state of a computer system (virtual or physical) using a structured state capture file based on metadata (not a memory image or memory dump), as described in more detail below. Note that the term "structured state capture file" is meant to be descriptive and exemplary only, and that any other names may be used as desired, so long as the functionality and attributes described herein are implemented. For brevity and convenience, the structured state capture file may be referred to herein as "the state capture file", "the structured file", "at least one structured state capture file", and so forth, and in various embodiments may be implemented as or in one or more files, data objects, or data structures, as desired.

In a memory dump/memory image based snapshot approach the memory contents correspond to a particular state at a particular point in time. It must be noted that the present approach is different also in the way that individual entries for running processes, open documents, accessible/mounted fileshares, etc., may be associated with a metadata tag that identifies the time at which this process was initiated. Optionally, the time at which the process was stopped or the drive was unmounted may be included. All this information may be enumerated within the same metadata based structured state capture file, and thus may be representative of multiple states at multiple points in time. A recapitulation action may be based on the restoration of all elements listed within this file that correspond to a particular time, or may selectively restore elements based on other criteria, such as application whitelists, fileshare whitelists, or authentication criteria, among others. An example of timestamped entries for running processes may be described as follows:

```
<ProcessList>
<ProcessName="c:\path\pbrush.exe"  starttime="09:03:11am" endtime="09:07:15am">
<ProcessName="d:\path\photoshop.exe" starttime="09:04:00am" endtime="">
</ProcessList>.
```

More generally, in some embodiments, both the state capture and state restoration may be performed based on user-provided configuration information (or stored configuration information). In other words, state capture and/or state restoration may be performed according to any of various criteria as desired.

State Capture

Figure 15:
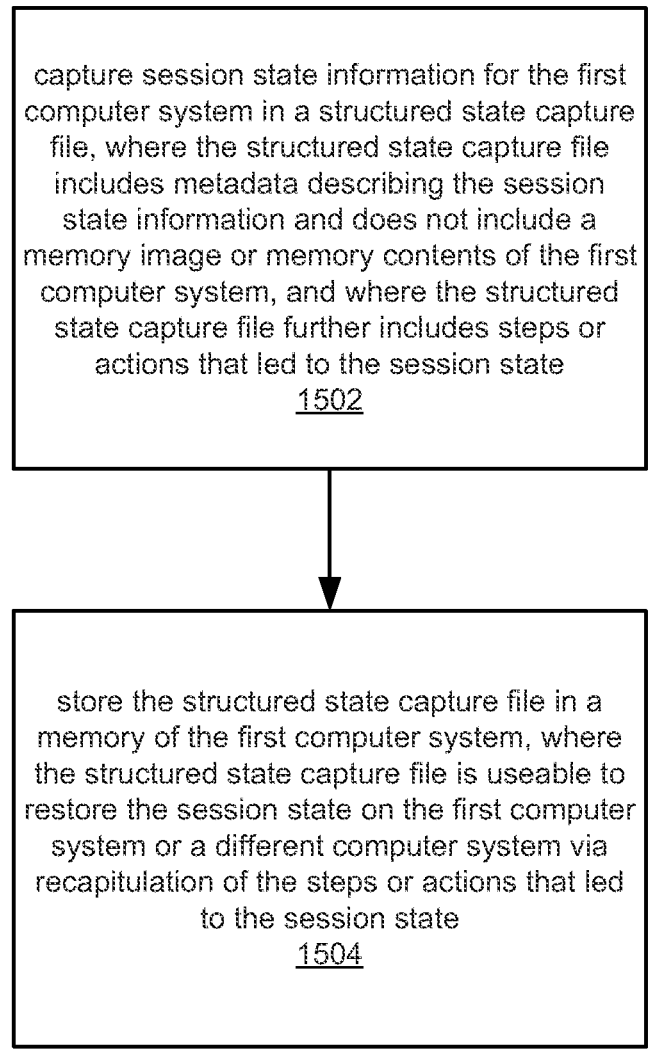
FIG. 15 is a flowchart diagram illustrating one embodiment of a method for capturing machine session state.

FIG. 15—Method for Capturing Machine Session State Without Using Memory Images

FIG. 15 is a flowchart diagram illustrating one embodiment of a method for capturing machine session state without using memory images (including a memory image, a disk image, register status, or memory dump). Note that in various embodiments the machine may be a virtual machine or a physical machine, i.e., a virtual or physical computer system.

As indicated in 1502, session state information for a first computer system may be captured in a structured state capture file (which may be implemented as one or more files or data objects, as desired). In other words, the session state information for the first computer system may be determined and stored in the structured state capture file. The structured state capture file may include metadata describing the session state and does not include a memory image or memory dump of the first computer system. Moreover, in some embodiments, the (metadata based) structured state capture file may further include steps or actions that led to the session state. In other words, in some embodiments, the structured state capture file may use metadata to encode or represent both the session state and the steps or actions which produced the session state.

The session state information may include state information regarding any of various (software and/or hardware) components of the computer system. For example, the session state information may include one or more of: the session state information may include one or more of: one or more applications currently executing on the first computer system, one or more processes (including background processes) or services currently executing on the first computer system, one or more network shares (storage devices or printers) currently mounted on the first computer system, one or more documents presently open on the first computer system, location, size, and placement of one or more windows on the first computer system, one or more user profiles currently in use by the first computer system, one or more background images and any other desktop customizations employed on the first computer system, location and placement of one or more mouse or keyboard cursors of the first computer system, placement of one or more icons and their order in a start bar or dock of the first computer system, or text entered in one or more browser windows, text fields or other text areas on the first computer system, among others. In other words, state information regarding any component of the computer system (which may be a virtual or physical machine) may be captured in the structured state capture file, as desired.

In 1504, the structured state capture file may be stored in a memory of the first computer system. The structured state capture file may be useable to restore the session state on the first computer system or a different computer system via recapitulation of the steps or actions that led to the session state. Said another way, the structured state capture file may be useable to restore or instantiate the session state on the first computer system or a different computer system in a stepwise manner by performing the steps or actions that put the computer system into the session state.

Exemplary Embodiments

Consider a software application (program, agent, etc.) residing on a system (e.g., computer or VM) whose session is to be captured, i.e., whose state information is to be determined and stored. This software application may obtain information on various aspects of the system, e.g., one or more of: applications currently executing on the computer system, processes, including background processes, or services executing on the computer system, network shares currently mounted, documents presently open, the locations, sizes and placement of windows, user profile currently in use (by the computer system), the background image and any other desktop customizations employed, the location and placement of mouse and keyboard cursors, the state of the operating system (OS) cut and paste buffer (clipboard), the placement of icons and their order in the start bar/systray and text entered in any browser windows, text fields and other text areas. As described above, in some embodiments, the structured state capture file may further include steps or actions that led to the session state.

Some or all of this information may be gathered and saved in a structured state capture file, described above, e.g., in an XML document which represents structured state information via metadata. As noted above, the structured state information does not include a memory image or memory dump. The structured state capture file may be useable to restore the session state on the first computer system or a different computer system via recapitulation of the steps or actions that led to the session state.

A more detailed embodiment is now described:

Session state information for a first computer (system), e.g., a client computer system, or a server computer system, may be determined. The session state information may represent a state (session state) of the first computer and may include state information for components of the first computer. The state information does not include a memory image, a disk image, register status, or memory dump for the first computer. The components of the first computer may include one or more of: at least one application executing on the first computer, at least one window of a graphical user interface on the first computer, or at least one process, possibly a background process, or service executing on the first computer, among others, as listed above. The state information may be stored in at least one structured (state capture) file, which may be human and machine readable, and may include respective tagged sections corresponding to the components of the first computer.

As noted above, in some embodiments, the state information may be for a virtual machine or a physical machine, i.e., a virtual or physical computer system. Thus, in some embodiments, the first computer may include a first virtual machine, and the state information may be for the first virtual machine executing within a first virtualization platform on the first computer, and the state information may represent a state of the first virtual machine and include state information for components of the first virtual machine. The components of the first virtual machine may thus include one or more of: at least one application executing on the first virtual machine, at least one window of a graphical user interface on the first virtual machine, or at least one process, possibly a background process, or service executing on the first virtual machine, among others, as presented above.

In some embodiments, the second virtualization platform may be a different type of virtualization platform than the first virtualization platform, and the first virtual machine may be incompatible with the second virtualization platform. In one embodiment, wherein the first virtual machine is implemented from a first virtual machine image file constructed according to a first virtual machine image format, and the first virtual machine image format is not supported by the second virtualization platform.

The following describes the capture of state for various exemplary aspects of a computer system, according to some embodiments.

Figure 12:
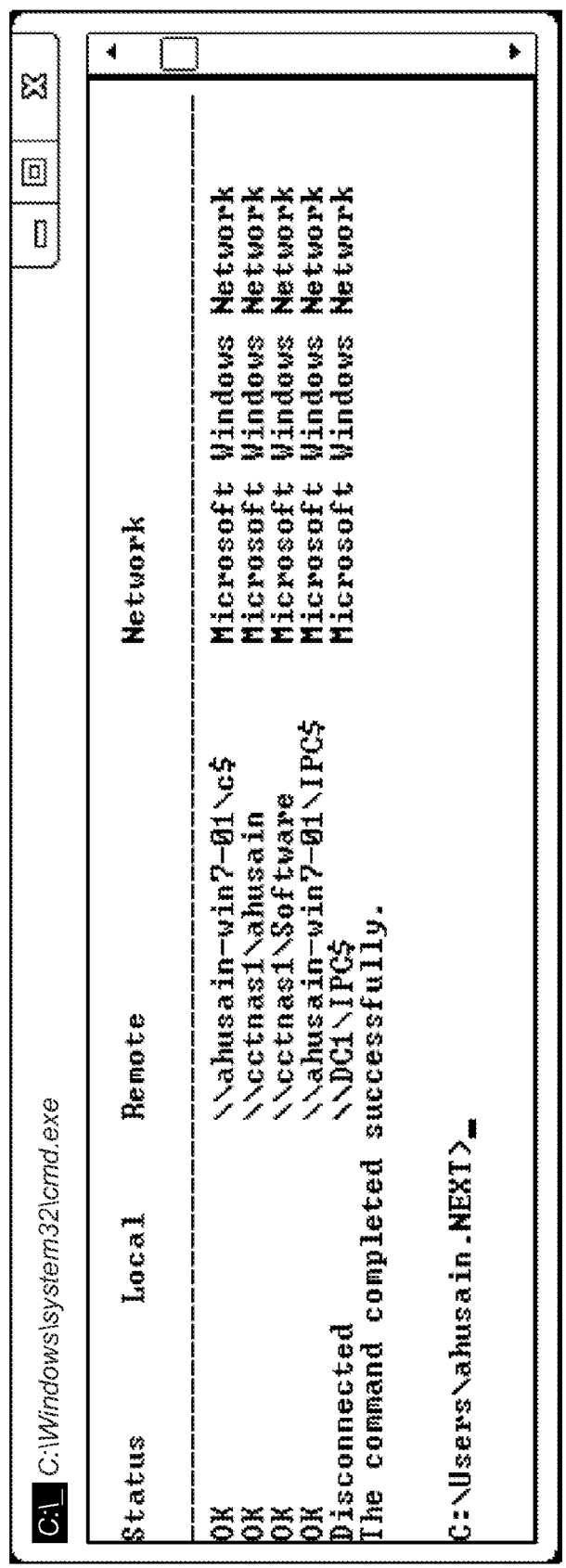
FIG. 12 is an exemplary screenshot illustrating the capture of location information of currently mounted remote fileshare resources, according to one embodiment.

For example, on a Microsoft Windows™ based system, in order to determine the currently connected drive shares, the application may leverage the Windows "net use" command, which may produce output similar to that shown in FIG. 12. As may be seen, this screenshot shows the location of the remote fileshare resources currently mounted. This information may be captured as text and stored to the XML file (or other type of file(s)) under an appropriately tagged subsection, for example:

```
<DriveShares>
<Share ID=1>
<Letter>Z</Letter>
<Location>\\ahusain-win7-01\c$</Location>
</Share>
<Share ID=2>
<Letter>Y</Letter>
<Location>\\cctnas1\ahusain</Location>
</Share>
...
```

Thus, in one embodiment, the application, or more generically, embodiments of the state capture method disclosed herein, may determine and store (capture) the state information for mounted network drive shares (shared drives), and more specifically, may capture and store this state information in a manner that requires less resources than would be required for an image based approach, and further, in a manner that is human and machine readable.

In another exemplary embodiment, the state capture method may discover currently running processes on the system. Following the above example, in a Windows™ based system, this can be achieved by using the "WMIC PROCESS get Caption, Commandline, Processid" command. Exemplary output produced thereby is shown in FIG. 13.

As shown, this exemplary output includes the name of the process, the path to the executable which launched the process, and the process ID (PID) of the process. Note that the PID can be used to infer order of execution. All of this information may be captured and logged, e.g., into the state XML file, under appropriately labeled tags, e.g., under the tag "<Process>". An example of such stored state information is:

```
<ProcessList>
    <Process ID="2444">
    <ProcessName>snmp.exe</ProcessName>
    <ProcessExe>c:\windows\system32\snmp.exe</ProcessExe>
</ProcessList>
```

Similarly, the method may query for active windows and their locations, resulting in output similar to that of FIG. 14. As shown, in this particular example, active windows include an email inbox window, a text file window with a list of windows, a "paint" program window, and three word processor document windows.

This output may then be parsed and stored, e.g., in the state XML file, under an appropriately labeled tag, for example, "<WindowGeometry>".

An example of such an entry (for a single active window) is given below:

```
<WindowGeometry>
    <WindowName>listwindows.pl</WindowsName>
    <ProcessName>notepad.exe</ProcessName>
    <WindowTitle>listwindows.pl — Notepad</WindowTitle>
    <Desktop>0</Desktop>
    <Visible>True</Visible>
    <Minimized>False</Visible>
    <zIndex>4</zIndex>
    <TopLeft> 150</TopLeft>
    <Width>531</Width>
    <Height>40</Height>
</ WindowGeometry >
```

Note that in this exemplary embodiment, in addition to the location of the window, its zIndex (location on the desktop in terms of the z axis (into the screen), i.e., where the window is in the stack of background/foreground windows), its window title, current window state (maximized/minimized), visibility, and the location of this window on a particular desktop (in virtual desktop or multi-monitor environments) are also recorded or captured.

The three examples above illustrate how state information for numerous aspects of the current session may be captured. Note, however, that these examples are not all-inclusive, and that the state information file(s), e.g., the XML file, can contain similar information for any items desired, such as, but not limited to:

Process priority for each process.
Processor affinity for each process.
List of currently loaded drivers.
List of currently enumerated USB or other peripheral devices.
Current power management policy in effect.
Location of all icons on desktop.
Desktop background.
File associations (default file type associations with specific applications).
List of installed applications.
Full or partial registry copies (registry archived in XML as part of state information XML file).
Any certificates present on the source system.
Browser settings, including history, currently open tabs etc.
Recently opened application list.
Recently opened document lists from individual applications, such as Microsoft Word™.
List of open ports and firewall status.
Current settings of any anti-virus, anti-spam or other security software on the source system.
Audio settings, including default input/output devices and audio levels.
Video settings, including default input/output devices and color levels (hue, sat, etc.).
Network connection state (i.e., enabled/disabled adaptors, adaptor settings).
Display settings (currently active displays, resolutions, colour depth etc.).

Thus, the method may produce a metadata based structured state capture file (or other data structure or structures), e.g., an XML-based state capture file, that can be read and examined by a human (or program), edited conveniently either programmatically or via a text editor, and can be duplicated in whole or in part, as desired. Further, the size of this file will almost necessarily be far smaller than an equivalent state captured using the traditional techniques of memory dumps/disk dumps or register state capture. For example, instead of capturing the memory associated with an entire Microsoft Word™ process, in embodiments of the present technique, just the name of the process, the location of associated icons and windows, and the currently open documents in Microsoft Word™ may be sufficient to "recreate" the state of the Microsoft Word™ application on a target system. In other words, rather than simply storing a memory image, the method may store higher-level descriptive information via which the state may be recreated.

Figure 16:
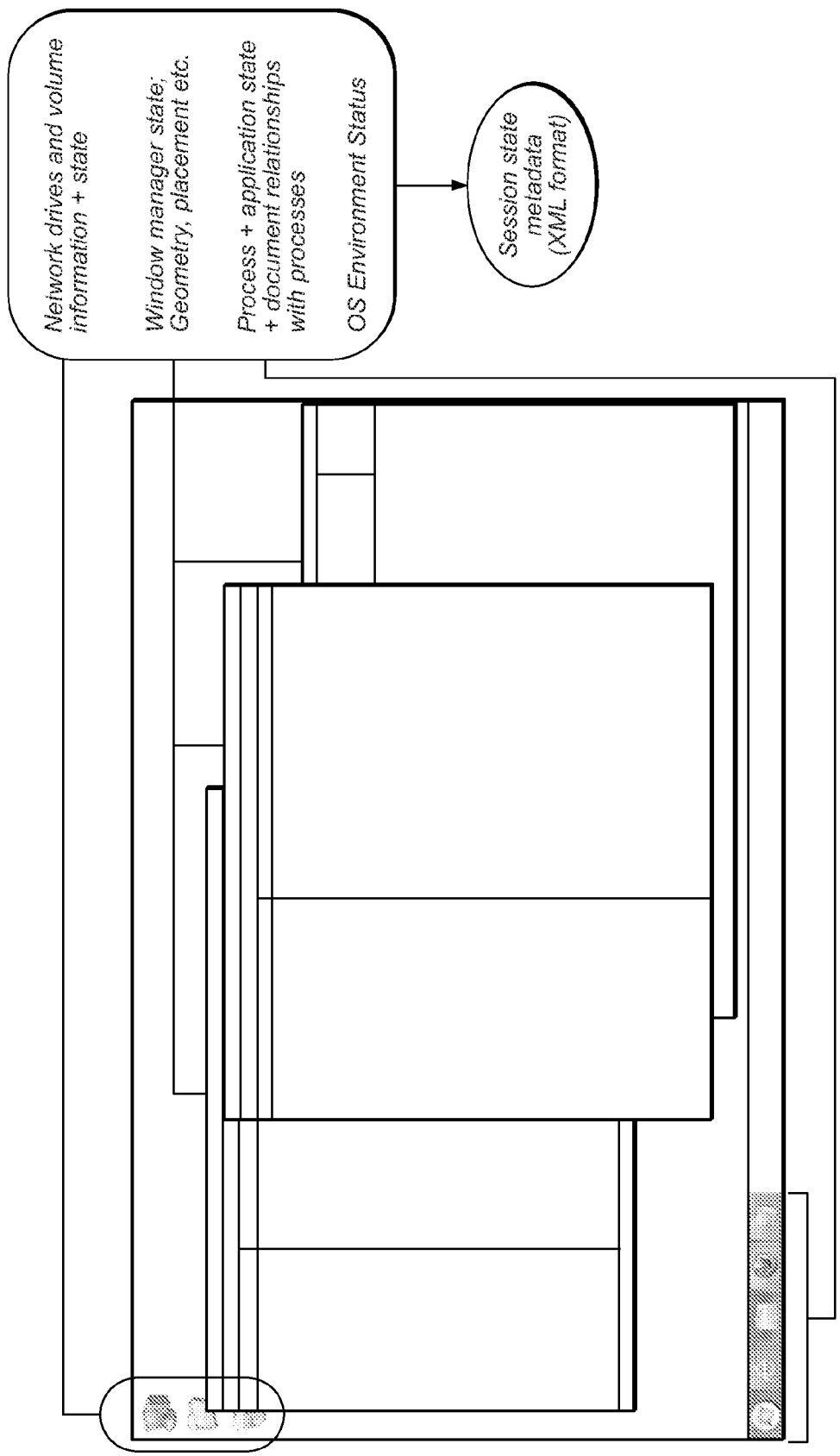
FIG. 16 illustrates virtual machine state capture, according to one embodiment.

FIG. 16 illustrates an exemplary capture of session state in the context of a computer system desktop, where the session state is captured as portable metadata, e.g., a portable XML file or structure (or multiple files or structures), that can be "replayed" or recapitulated on another virtual or physical desktop (OS). For example, a "home" session may be migrated to a "work" computer, so long as resources are accessible from both locations.

As FIG. 16 shows, in this exemplary embodiment, the state information captured may include one or more of: network drives and volume information and state, as indicated by the top left rectangle around network drive icons displayed on the desktop, window manager(s) state, including window geometry, placement, etc., e.g., for the windows displayed on the desktop, process and application state for the processes and applications active on the computer system, as indicated on the process/application bar at the bottom right of the desktop), as well as OS environment status (or state). It should be noted, however, that any other state information may be captured as desired, e.g., network connection state, and so forth.

More specifically, window manager integration may allow the method to build a metadata based snapshot (which is specifically not a memory image, but rather is a metadata representation of state information, as explained above) of current window types, positions, states, and locations. The method may collect network share, mounted drive, and running process information (e.g., state). In some embodiments, running processes may be queried for contextual information, e.g., open documents, etc. All capture information may be bundled and possibly encrypted, and readied for network transport. Moreover, playback mechanisms on a different (target) system, e.g., a client system, may allow the complete desktop environment (and/or system state in general) to be recreated, as discussed below under "State Restoration".

This approach has advantages over memory checkpointing (i.e., core dump) approaches in that it allows virtual sessions (within VMs) to be migrated to physical systems, and vice-versa. Moreover, embodiments of the techniques disclosed herein may allow migrations between sessions hosted on different brands/types of hypervisors.

As shown in FIG. 16, the various states and related information may be captured, encoded, or otherwise stored, as session state metadata, e.g., in XML format. These metadata, which may be referred to as a session state snapshot (which is not to be confused with an image file or image based memory snapshots), may in some embodiments be used for desktop session state restoration as another aspect or dimension of "Time Machine" or "System Restore" functionality (or functional equivalents). As mentioned above, the session state metadata may be stored in a structured state capture file, and may also include the steps or actions that led to the session state.

It should be noted that any of the features, functionalities, and techniques disclosed herein may be used in any combinations desired. For example, in various embodiments, the session state may be captured from a virtual machine session and restored as a virtual machine session or a physical computer system session, or may be captured from a physical machine session and restored as a virtual machine session or a physical computer system session. Moreover, in some embodiments where the session state is captured from a virtual machine session and restored as a virtual machine session, the virtualization platforms (i.e., hypervisors) may be different. Additionally, the VM techniques described above that utilize VM images or image files may be implemented using the metadata based structured state capture files disclosed herein instead of the VM images or image files.

Some exemplary embodiments of the method of FIG. 15 are now presented.

In some embodiments, the structured state capture file may be provided to a server computer over a network for subsequent provision to the first computer system or one or more different computer systems for restoration of the session state. In one embodiment, providing the structured state capture file to a server computer over a network may include storing the structured state capture file on a network accessible storage device, and the server computer retrieving the structured state capture file from the network accessible storage device.

Accordingly, the structured state capture file may be received from the server computer over the network; and the session state restored on the first computer system using the structured state capture file, including: retrieving session state information and the steps or actions that led to the session state from the structured state capture file, and recapitulating the steps or actions on the first computer system, thereby establishing the session state on the first computer system.

Moreover, in one embodiment, a request for the structured state capture file may be sent (by the first computer) to the server computer over the network, and the structured state capture file may thus be received from the server computer over the network in response to said sending the request. In some embodiments, authentication credentials may be sent to the server computer over the network, and receiving the structured state capture file from the server computer over the network may be performed further in response to the server computer authenticating the first computer system. Moreover, in some embodiments, the structured state capture file may be encrypted prior to storing, thereby generating an encrypted structured state capture file, in which case storing the structured state capture file may be or include storing the encrypted structured state capture file.

The session state may be restored on the first computer system using the structured state capture file, including retrieving session state information and the steps or actions that led to the session state from the structured state capture file, and recapitulating the steps or actions on the first computer system, thereby establishing the session state on the first computer system.

As noted above, in some embodiments, the first computer system may implement a virtual machine (VM). Accordingly, capturing session state information for the first computer system may include capturing session state information of the VM, where the structured state capture file may be useable to restore the session state of the VM on the first computer system or the different computer system via recapitulation of the steps or actions that led to the session state.

In a further embodiment, the structured state capture file may also include current system time of the first computer system, where the current system time indicates when the session state information was captured.

State Restoration

Figure 17:
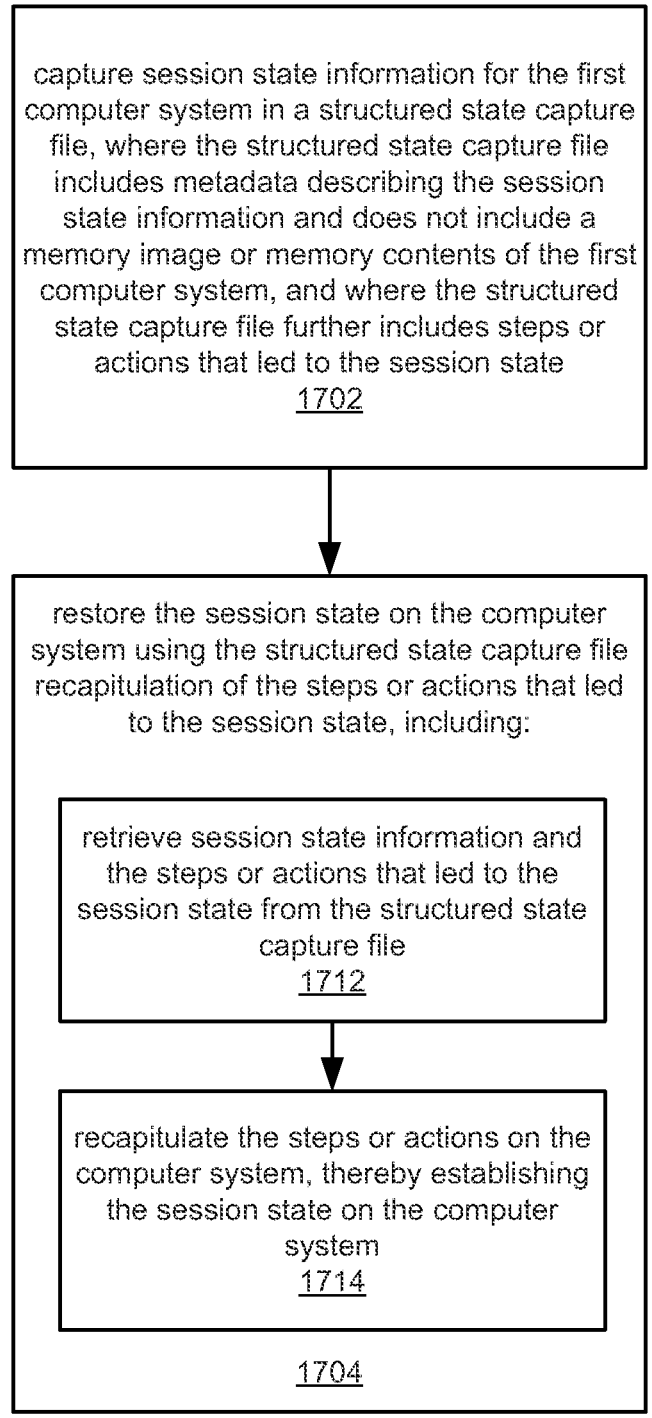
FIG. 17 is a flowchart diagram illustrating one embodiment of a method for restoring machine session state.

FIG. 17—Method for Capturing and Restoring Machine Session State without Using Memory Images FIG. 17 is a flowchart diagram illustrating one embodiment of a method for restoring or establishing machine session state without using memory images (including a memory image, a disk image, register status, or memory dump). As with the method of FIG. 15, in various embodiments the machine may be a physical machine or a virtual machine, i.e., implemented on a physical computer system. Note that the method may be performed by a computer system that may or may not be same computer system from which the session state was captured.

As indicated in 1702, a structured state capture file (which may be implemented as one or more files or data objects, as desired) that includes session state information for a first computer system may be received, e.g., by a computer system, e.g., the first computer system or a different computer system.

As with the method of FIG. 15, the structured state capture file may include metadata describing the session state and does not include a memory image or memory dump of the first computer system. In some embodiments, the received structured state capture file may have been generated via an embodiment of the method of FIG. 15, e.g., performed by the first computer system. As noted above, in some embodiments, the (metadata based) structured state capture file may further include steps or actions that led to the session state, i.e., the structured state capture file may use metadata to encode or represent both the session state and the steps or actions which produced the session state.

As described above with respect to FIG. 15, the session state information may include state information regarding any of various (software and/or hardware) components of the first computer system, e.g., may include one or more of: the session state information may include one or more of: one or more applications currently executing on the first computer system, one or more processes (including background processes) or services currently executing on the first computer system, one or more network shares (storage devices or printers) currently mounted on the first computer system, one or more documents presently open on the first computer system, location, size, and placement of one or more windows on the first computer system, one or more user profiles currently in use by the first computer system, one or more background images and any other desktop customizations employed on the first computer system, location and placement of one or more mouse or keyboard cursors of the first computer system, placement of one or more icons and their order in a start bar or dock of the first computer system, or text entered in one or more browser windows, text fields or other text areas on the first computer system, among others. In other words, state information regarding any component of the first computer system (which may be a virtual or physical machine) may be included in the structured state capture file, as desired.

In 1704, the session state may be restored (i.e., established or instantiated) on the computer system (e.g., the first computer system or a different computer system) using the structured state capture file. The session state may be restored by retrieving session state information and the steps or actions that led to the session state from the structured state capture file, as indicated in 1712, and recapitulating the steps or actions on the computer system, thereby establishing the session state on the computer system, as indicated in 1714. Said another way, the structured state capture file may be used to restore or instantiate the session state of the first computer system on the first computer system or a different computer system in a stepwise manner by performing the steps or actions that put the first computer system into the session state.

Exemplary Embodiments

Thus, in some embodiments, the method may include restoring or recapitulating the state of the system on a target system or platform using the captured state information, e.g., on a client computer system. In some embodiments, state restoration may be achieved by using a restoration module (i.e., a software program or programs) that runs on the target system. Alternatively (or additionally), the module (program) may execute on an intermediary system but may execute commands on a target system via RPC (Remote Procedure Call) or RPC style functionality. The restoration module may obtain access to the state capture file (or data structure), e.g., an XML-based state capture file, which may exist on the Web, on a file share, on a remote system, on an FTP, SMB, CIFS or NFS server, or any form of accessible local or remote storage. The structured state capture file may be parsed and, corresponding to each of the stored sections, appropriate steps may be taken to execute actions that will result in state restoration. In other words, the method may parse the state information stored in the state capture file, and perform steps or actions to recapitulate the state on a target system, e.g., using the human and machine readable tagged state capture file.

For example, a set of recapitulation actions to restore the <ProcessList> on a target computer (e.g., the first computer system or a different computer system) on which the session state is being restored may iterate over the list of all processes whose names are represented within a <ProcessList> block of the structure state capture file, and may execute the listed processes, e.g., applications, programs, etc. Once the processes have been executed, another meta data block, for example, listed open documents, may be read and processed. Scripting systems such as WSH (Windows Script Host) or command line options may be used to invoke the necessary actions that enable the running processes to open and access the documents specified in this meta data block. A further example of such recapitulation steps might be to restore the state of network connected drives or storage devices. The drives connected to the source computer system (e.g., the first computer system) may be listed in a corresponding metadata block in the structured state capture file. Depending on the Operating System in use on the target computer, a command such as net use (Windows) or mount (Linux/Unix/Mac OS X) may be used to iterate over all source drives and mount/recreate the mappings on the target computer. In the event that login credentials are required to mount these drives/recreate the mappings, these credentials may be stored in the structured state capture file, which, as noted above, may be encrypted.

Said in a slightly different way, a second computer may be set to a state corresponding to the state of the first computer based on the state information in the at least one structured (state capture) file. Moreover, the setting is performed without using a memory image, a disk image, register status, or register contents for the first computer. In one embodiment, the setting include parsing one or more of the sections of the at least one structured file to determine actions for restoring state of one or more of the corresponding components, and performing the actions, thereby recapitulating the state of the one or more components on the second computer. The performing the one or more actions may include: for each component of the one or more components: instantiating or invoking the component on the second computer, and performing a respective plurality of steps to configure the component in accordance with the state information of the component stored in the at least one structured file, thereby re-establishing the state of the component on the second computer.

In an embodiment directed to VM migration, the setting (of state) may include setting a pre-existing second virtual machine within a second virtualization platform on the second computer to a state corresponding to the state of the first virtual machine based on the state information in the at least one structured file, where, as above, the setting is performed without using a memory image, a disk image, or register status or contents, for the first computer, thereby recapitulating the state of the one or more components in the second virtual machine on the second computer.

In some embodiments, a first software application is currently executing on the first virtual machine and has a first execution state when the state information is determined. The state information may include information representing the first execution state of the first software application, and setting the second virtual machine to the state corresponding to the state of the first virtual machine may include initiating execution of the first software application on the second virtual machine, and setting an execution state of the first software application on the second virtual machine to the first execution state using the state information.

In another embodiment, a first graphical user interface window having a first display state is currently displayed by the first virtual machine when the state information is determined. The state information may include information representing the first display state of the first graphical user interface window, and setting the second virtual machine to the state corresponding to the state of the first virtual machine may include re-creating the first graphical user interface window on the second virtual machine, and setting a display state of the first graphical user interface window on the second virtual machine to the first display state using the state information.

In a further embodiment, a first network connection having a first network state is currently open on the first virtual machine when the state information is determined. The state information may include information representing the first network state of the first network connection, and setting the second virtual machine to the state corresponding to the state of the first virtual machine may include re-creating the first network connection on the second virtual machine, and setting a network state of the first network connection on the second virtual machine to the first network state using the state information.

In one embodiment, the determining, storing, and setting may be performed in response to receiving a request to move execution of the first virtual machine from the first computer to the second computer. The method may further include stopping execution of the first virtual machine on the first computer. Additionally, a first user may have a first remote communication session open to the first virtual machine on the first computer before the request is received, and the method may include replacing the first remote communication session with a second remote communication session open to the second virtual machine on the second computer. In one embodiment, execution of the first virtual machine may be paused before determining the state information.

The first virtual machine may include a software agent that executes in the first virtual machine to determine the state information for the first virtual machine. The second virtual machine may include a software agent that executes in the second virtual machine to set the second virtual machine to the state corresponding to the state of the first virtual machine using the state information. The first computer and the second computer may be connected through a wide area network (WAN) connection, and the state information may be transmitted from the first computer to the second computer through the WAN connection.

Alternatively, the first computer and the second computer may be connected to a third computer through a WAN connection, and the state information may be transmitted from the first computer to the second computer through the WAN connection via the third computer. The setting may be performed at least partly by software executing on the third computer.

In some embodiments, the setting may further include filtering (or otherwise constraining use of) the sections of the at least one structured file based on one or more criteria, thereby omitting state restoration of at least one component in said setting. In one embodiment, the setting may further include performing one or more specified auxiliary actions in addition to the actions, thereby differentiating the state of the second virtual machine from the state of the first virtual machine, where the one or more specified auxiliary actions are performed with respect to a component of the second virtual machine. Additionally, performing one or more specified auxiliary actions may include performing the one or more specified auxiliary actions contingent on at least one specified condition.

Exemplary detailed state restoration/recapitulation embodiments are now described.

Continuing the example from the state capture section above, in one exemplary embodiment, the method (e.g., the state restoration module) may encounter the following exemplary section in the state capture file directed to drive shares:

```
<DriveShares>
<Share ID=1>
<Letter>Z</Letter>
<Location>\\ahusain-win7-01\c$</Location>
</Share>
<Share ID=2>
<Letter>Y</Letter>
<Location>\\cctnas1\ahusain</Location>
</Share>
```

The module (or method) may parse each entry and attempt to recreate the network connections and drive letter associations accordingly. For example, in a Windows based system, this can be achieved by executing the following commands (for the system of the indicated user):

```
Net use Z: \\ahusain-win7-01\c$
Net use y: \\cctnas1\ahusain
```

These commands (or equivalents), once completed, may ensure that the same network shares and drive letter mappings that existed on the source system are now recreated on the target system on which state is being restored. Note that it does not matter whether the source system was a physical system or a VM, or if the source and target systems have the same amount of memory, CPU, or storage. In other words, the present method for state restoration may be oblivious or insensitive to these issues.

It may be possible that the commands given above fail due to the fact that the remote systems being accessed are not available, or the system on which state is being restored cannot access them. In one embodiment, if this occurs, the method (e.g., the restoration module) may generate an error and stop, may gracefully continue after providing warnings to the console or generating a local or remote log file entry, or may take some other custom remedial action that has been specified in its configuration. For example, the restoration module may include or access configuration entries which specify an alternate command to execute in the event that a particular section or particular type of entry found in the state capture file cannot be successfully recreated/played-back/restored.

Similar to the example above, the method (e.g., restoration module) may parse other sections of the state capture file and execute the necessary commands or make the appropriate configuration modifications to achieve a state similar or equivalent to the state found on the original (source) system from which the state capture file was produced.

Note that while in some embodiments it is not be necessary to list the exact commands for each such section to recapitulate the associated state, in other embodiments, specific commands or actions may be indicated. As a further example following the storage restoration described above, the <ProcessList> section entries may be processed, resulting in the associated process executables being executed. Similarly, processing of <WindowGeometry> entries may result in the restoration module obtaining window handles for the appropriate windows after all the appropriate processes have been kicked off, and using these window handles to move the windows around the desktop on an automatic basis, so that all windows have titles, locations and sizes equivalent (or similar) to those on the source system. In a similar manner, all other information in the state capture file may be processed and "played back" on the target system, thus recapitulating the state of the source system on the target system.

It should be further noted that in some embodiments, state restoration does not have to be performed completely, i.e., exhaustively. In other words, in some embodiments, filters and/or constraints may be imposed on the state restoration process to limit or otherwise control which state information, and thus, which states, are processed and restored. For example, a filter may be set so that no process named "notepad.exe" may be executed during the restoration process. In this case, the method (e.g., restoration module), upon encountering an entry in the <ProcessList> section which requires the execution of the notepad.exe process, may either abort the restoration process or skip the execution of that particular filtered line while continuing the rest of the restoration process. These actions may be determined by instructing the restoration module through arguments, switches, or configuration files, among other means.

While the above example references a process filter as an exemplary constraint on state capture and restoration, such filters, constraints, or exceptions can be applied to any or all elements or sections of the state capture XML file.

In addition to filters, there can also be "must execute" sections that may be automatically layered or added to the state capture file when it is being restored on a specific system, on a group of systems, or on all systems. Such sections may be referred to as addenda, addendum sections, or auxiliary sections, although these names are for convenience only. For example, in one exemplary embodiment, there may be a globally applicable addendum which the restoration module applies to the <ProcessList> section of every state capture file it restores so that a specific process is always executed regardless of whether it was found in the original source system on which the state capture XML file was produced. These auxiliary sections or addendums may apply to any section of the state capture XML file. Further, they may be conditioned on a variety of environmental factors. For example, in various embodiments, the restoration module may be instructed to either run or not run the additional "must execute" sections contingent upon one or more of the following:

if a specific user is logged in;
if a particular group of users is logged in;
if it is a particular time of day, month, week or year;
if a specific entry is found in the state capture XML file;
if the target system meets a specific configuration or inventory criteria (e.g., CPU, memory, apps installed, version of OS etc.);
if the source system meets a specific configuration or inventory criteria; or
if the administrator has set-up certain flags on a local configuration file or a remotely accessible configuration file/DB or bank of configuration information (semaphores, files, DBs, XML config, client/server, FTP, NFS, file shares, RPC, web services etc., are all potential sources for such configuration information).

In other words, setting (restoring/recapitulating) the state may include performing one or more specified auxiliary actions in addition to the actions to further differentiate the state of the second virtual machine from the state of the first virtual machine, and the one or more specified auxiliary actions may be performed contingent on at least one specified condition.

Multiple such additional sections can be added to the restore process. For example, a set of global filters may be specified/applied, then a must-execute section for a specific time of day may be specified/applied, and then, added to that, another must-execute section tied to a particular user may be specified/applied. More generally, in various embodiments, state information sections (see above), filters/exceptions/constraints, and auxiliary sections may be stored and/or processed in any order as desired. The final state restoration then results from a union of the state information gathered from the original source system and a set of incremental steps or actions which differentiate the target state from the source state.

As noted above, any of the features and functionalities disclosed herein may be used in any combinations desired. Some exemplary embodiments of the method of FIG. 17 are now presented.

As noted above, in some embodiments, the first computer system may implement a virtual machine (VM), and restoring the session state on the computer system may include restoring the session state of the VM on the computer system.

In some embodiments, receiving the structured state capture file may include receiving the structured state capture file from a server computer over a network. For example, a request for the structured state capture file may be sent (by the computer system) to the server computer over the network, and the structured state capture file may be received from the server computer over the network in response to sending the request.

In one embodiment, authentication credentials may be sent to the server computer over the network, and receiving the structured state capture file from the server computer over the network may be performed further in response to the server computer authenticating the first computer system. Additionally, in some embodiments, the structured state capture file may be encrypted, and the structured state capture file may be decrypted prior to the restoring.

Note that in some embodiments, one or more of such session snapshots (again, not an image file), e.g., captured in one or more structured state capture files, may be stored on a server (or servers). A user of a client system may connect to a server and download a client session snapshot, i.e., client session metadata, possibly in the form of an XML file or structure (or files/structures). The downloaded client session snapshot may then be used to restore, i.e., establish, recreate, or recapitulate, the session on the client system. Thus, embodiments of the state capture techniques disclosed herein may be used to capture the respective states of various client sessions (or even server sessions, if desired), and embodiments of the state restoration techniques disclosed herein may be used to restore (i.e., recapitulate) any of the captured session states onto a target client system (or even a server system, if desired).

In one embodiment, the server or servers that store the downloadable session state information may be blade computers, as described above.

Server Functionality

In one embodiment, a server computer system may be configured to perform the following:

A structured state capture file that includes session state information for a first computer system in, where the structured state capture file includes metadata describing the session state and does not include a memory image or memory dump of the first computer system, and where the structured state capture file further includes steps or actions that led to the session state. As noted above, the session state information may include one or more of: the session state information may include one or more of: one or more applications currently executing on the first computer system, one or more processes (including background processes) or services currently executing on the first computer system, one or more network shares (storage devices or printers) currently mounted on the first computer system, one or more documents presently open on the first computer system, location, size, and placement of one or more windows on the first computer system, one or more user profiles currently in use by the first computer system, one or more background images and any other desktop customizations employed on the first computer system, location and placement of one or more mouse or keyboard cursors of the first computer system, placement of one or more icons and their order in a start bar or dock of the first computer system, or text entered in one or more browser windows, text fields or other text areas on the first computer system, among others. In other words, state information regarding any component of the first computer system (which may be a virtual or physical machine) may be included in the structured state capture file, as desired.

In one embodiment, the structured state capture file may be provided (by the server computer system) to the first computer system or a different computer system over a network, where the structured state capture file may be useable to restore the session state on the first computer system or the different computer system via recapitulation of the steps or actions that led to the session state.

Moreover, in some embodiments, the server computer system may be configured to receive a request for the structured state capture file from the first computer system or the different computer system over the network, and providing the structured state capture file may be performed in response to receiving the request. Additionally, in one embodiment, the server may be configured to authenticate the first computer system or the different computer system in response to receiving the request, where the authentication is performed prior to providing the structured state capture file.

For example, in some embodiments, the server computer system may be configured to store a plurality of structured state capture files, where each structured state capture file includes respective session state information for a respective first computer system, including metadata describing the respective session state and does not include a memory image or memory dump of the respective first computer system, and as noted above, the structured state capture file may further includes steps or actions that led to the respective session state. Similarly, the respective session state information may include one or more of: the session state information may include one or more of: one or more applications currently executing on the first computer system, one or more processes (including background processes) or services currently executing on the first computer system, one or more network shares (storage devices or printers) currently mounted on the first computer system, one or more documents presently open on the first computer system, location, size, and placement of one or more windows on the first computer system, one or more user profiles currently in use by the first computer system, one or more background images and any other desktop customizations employed on the first computer system, location and placement of one or more mouse or keyboard cursors of the first computer system, placement of one or more icons and their order in a start bar or dock of the first computer system, or text entered in one or more browser windows, text fields or other text areas on the first computer system, among others.

The server computer system may be further configured to provide at least one of the plurality of structured state capture files to the respective first computer system or at least one of a plurality of different computer systems over a network, e.g., in response to a request from a client computer, as described in detail above, where the at least one structured state capture file is useable to restore the respective session state on the respective first computer system or the at least one of the plurality of different computer systems via recapitulation of the steps or actions that led to the respective session state.

As noted above, in one embodiment, the first computer system may implement a virtual machine (VM), where the structured state capture file includes session state information for the VM, and where the structured state capture file is useable to restore the session state of the VM on the first computer system or the different computer system via recapitulation of the steps or actions that led to the session state.

As noted above, in some embodiments the structured state capture file may be encrypted.

Benefits of the techniques disclosed herein may include one or more of the following:

1) The state information can be represented with minimal information and does not need to contain memory dump or register contents.

2) The state information is parseable and understandable easily by processed, applications, and even by humans. This is very different from large memory binary dumps of physical or virtual machines.

3) The restoration technique is flexible so that it can be used to restore the state on entirely different machines, for example, a source machine that has 4 GB of RAM can have its state captured and restored on a target machine that has 2 GB or 16 GB of RAM. This is difficult or impossible to do with memory dumps/restores as the memory locations captured have to properly map to the memory locations restored.

4) The restoration technique allows for selective restoration by means of "filter" application. For example, if four applications, including a "paint" application, were running in the original session, during restoration, the system or user can specify restoration "minus" the restoration of the "paint" application. This is not possible with prior art memory capture/restore techniques, or in prior art Virtual Machine state snapshot techniques, none of which differentiate between individual applications.

5) The restoration technique allows for selective restoration of shares and shared resources that were part of the original session. For example, if the original session included two remote resources (file shares) mounted as drives Z: and Y: during restoration, the user or system could specify that no remote resources should be restored, or that no drive mounted to the letter Z: should be restored, or that no connection to the server "ABC" should be recreated.

Thus, the novel techniques disclosed herein may provide great flexibility and control in capturing and restoring machine state, and further, may be more efficient and human friendly (useable) than prior art approaches. Moreover, various of the disclosed techniques may be particularly beneficial for migration of virtual machines. More specifically, embodiments of the methods and techniques disclosed herein may allow a current state of a user (e.g., client) session or system to be captured and moved to a different physical system, virtual machine, or other environment, e.g., another client session or system.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by a first computer system to implement:
    capturing session state information for the first computer system in a structured state capture file, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
    one or more applications currently executing on the first computer system;
    one or more processes or services currently executing on the first computer system;
    one or more network shares currently mounted on the first computer system;
    one or more documents presently open on the first computer system;
    location, size, and placement of one or more windows on the first computer system;
    one or more user profiles currently in use by the first computer system;
    one or more background images and any other desktop customizations employed on the first computer system;
    location and placement of one or more mouse or keyboard cursors of the first computer system;
    placement of one or more icons and their order in a start bar or dock of the first computer system; or
    text entered in one or more browser windows, text fields and other text areas on the first computer system; and
    storing the structured state capture file in a memory of the first computer system, wherein the structured state capture file is useable to restore the session state on the first computer system or a different computer system via recapitulation of the steps or actions that led to the session state.

2. The non-transitory computer-accessible storage medium of claim 1, wherein the program instructions are further executable to implement:
    providing the structured state capture file to a server computer over a network for subsequent provision to the first computer system or one or more different computer systems for restoration of the session state.

3. The non-transitory computer-accessible storage medium of claim 2, wherein the program instructions are further executable to implement:
    receiving the structured state capture file from the server computer over the network; and
    restoring the session state on the first computer system using the structured state capture file, comprising:
        retrieving session state information and the steps or actions that led to the session state from the structured state capture file; and
        recapitulating the steps or actions on the first computer system, thereby establishing the session state on the first computer system.

4. The non-transitory computer-accessible storage medium of claim 3, wherein the program instructions are further executable to implement:
    sending a request for the structured state capture file to the server computer over the network, wherein said receiving the structured state capture file from the server computer over the network is performed in response to said sending the request.

5. The non-transitory computer-accessible storage medium of claim 4 wherein the program instructions are further executable to implement:
    sending authentication credentials to the server computer over the network, wherein said receiving the structured state capture file from the server computer over the network is performed further in response to the server computer authenticating the first computer system.

6. The non-transitory computer-accessible storage medium of claim 2, wherein said providing the structured state capture file to a server computer over a network comprises:
    storing the structured state capture file on a network accessible storage device; and
    the server computer retrieving the structured state capture file from the network accessible storage device.

7. The non-transitory computer-accessible storage medium of claim 1 wherein the program instructions are further executable to implement:
    encrypting the structured state capture file prior to said storing, thereby generating an encrypted structured state capture file, wherein said storing the structured state capture file comprises storing the encrypted structured state capture file.

8. The non-transitory computer-accessible storage medium of claim 1, wherein the program instructions are further executable to implement:
    restoring the session state on the first computer system using the structured state capture file, comprising:
        retrieving session state information and the steps or actions that led to the session state from the structured state capture file; and
        recapitulating the steps or actions on the first computer system, thereby establishing the session state on the first computer system.

9. The non-transitory computer-accessible storage medium of claim 1, wherein the first computer system implements a virtual machine (VM), and wherein said capturing session state information for the first computer system comprises:
    capturing session state information of the VM; and
    wherein the structured state capture file is useable to restore the session state of the VM on the first computer system or the different computer system via recapitulation of the steps or actions that led to the session state.

10. The non-transitory computer-accessible storage medium of claim 1, wherein the structured state capture file further comprises:
    current system time of the first computer system, wherein the current system time indicates when the session state information was captured.

11. A non-transitory computer-accessible storage medium storing program instructions executable by a computer system to implement:
- receiving a structured state capture file comprising session state information for a first computer system, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
- one or more applications currently executing on the first computer system;
- one or more processes or services currently executing on the first computer system;
- one or more network shares currently mounted on the first computer system;
- one or more documents presently open on the first computer system;
- location, size, and placement of one or more windows on the first computer system;
- one or more user profiles currently in use by the first computer system;
- one or more background images and any other desktop customizations employed on the first computer system;
- location and placement of one or more mouse or keyboard cursors of the first computer system;
- placement of one or more icons and their order in a start bar or dock of the first computer system; or
- text entered in one or more browser windows, text fields and other text areas on the first computer system; and
- restoring the session state on the computer system using the structured state capture file, comprising:
  - retrieving session state information and the steps or actions that led to the session state from the structured state capture file; and
  - recapitulating the steps or actions on the computer system, thereby establishing the session state on the computer system.

12. The non-transitory computer-accessible storage medium of claim 11, wherein said receiving the structured state capture file comprises:
- receiving the structured state capture file from a server computer over a network.

13. The non-transitory computer-accessible storage medium of claim 12, wherein the program instructions are further executable to implement:
- sending a request for the structured state capture file to the server computer over the network, wherein said receiving the structured state capture file from the server computer over the network is performed in response to said sending the request.

14. The non-transitory computer-accessible storage medium of claim 13 wherein the program instructions are further executable to implement:
- sending authentication credentials to the server computer over the network, wherein said receiving the structured state capture file from the server computer over the network is performed further in response to the server computer authenticating the first computer system.

15. The non-transitory computer-accessible storage medium of claim 11, wherein the structured state capture file is encrypted, and wherein the program instructions are further executable to implement:
- decrypting the structured state capture file prior to said restoring.

16. The non-transitory computer-accessible storage medium of claim 11, wherein the first computer system implements a virtual machine (VM), and wherein said restoring the session state on the computer system comprises:
- restoring the session state of the VM on the computer system.

17. A non-transitory computer-accessible storage medium storing program instructions executable by a server computer system to implement:
- storing a structured state capture file that comprises session state information for a first computer system, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
- one or more applications currently executing on the first computer system;
- one or more processes or services currently executing on the first computer system;
- one or more network shares currently mounted on the first computer system;
- one or more documents presently open on the first computer system;
- location, size, and placement of one or more windows on the first computer system;
- one or more user profiles currently in use by the first computer system;
- one or more background images and any other desktop customizations employed on the first computer system;
- location and placement of one or more mouse or keyboard cursors of the first computer system;
- placement of one or more icons and their order in a start bar or dock of the first computer system; or
- text entered in one or more browser windows, text fields and other text areas on the first computer system; and
- providing the structured state capture file to the first computer system or a different computer system over a network, wherein the structured state capture file is useable to restore the session state on the first computer system or the different computer system via recapitulation of the steps or actions that led to the session state.

18. The non-transitory computer-accessible storage medium of claim 17, wherein the program instructions are further executable to implement:
- receiving a request for the structured state capture file from the first computer system or the different computer system over the network, wherein said providing the structured state capture file is performed in response to said receiving the request.

19. The non-transitory computer-accessible storage medium of claim 18, wherein the program instructions are further executable to implement:
- authenticating the first computer system or the different computer system in response to said receiving the request, wherein said authentication is performed prior to said providing.

20. The non-transitory computer-accessible storage medium of claim 18, wherein the structured state capture file is encrypted.

21. The non-transitory computer-accessible storage medium of claim 17, wherein the first computer system implements a virtual machine (VM), wherein the structured state capture file comprises session state information for the VM, and wherein the structured state capture file is useable to restore the session state of the VM on the first computer system or the different computer system via recapitulation of the steps or actions that led to the session state.

22. The non-transitory computer-accessible storage medium of claim 17, wherein the program instructions are further executable to implement:
storing a plurality of structured state capture files, wherein each structured state capture file comprises respective session state information for a respective computer system, wherein each structured state capture file comprises metadata describing the respective session state and does not include a register status, a memory image, or memory dump of the respective computer system, wherein the structured state capture file further comprises steps or actions that led to the respective session state, wherein the respective session state information comprises one or more of:
one or more applications currently executing on the first computer system;
one or more processes or services currently executing on the first computer system;
one or more network shares currently mounted on the first computer system;
one or more documents presently open on the first computer system;
location, size, and placement of one or more windows on the first computer system;
one or more user profiles currently in use by the first computer system;
one or more background images and any other desktop customizations employed on the first computer system;
location and placement of one or more mouse or keyboard cursors of the first computer system;
placement of one or more icons and their order in a start bar or dock of the first computer system; or
text entered in one or more browser windows, text fields and other text areas on the first computer system; and
providing at least one of the plurality of structured state capture files to the respective computer system or at least one of a plurality of different computer systems over a network, wherein the at least one structured state capture file is useable to restore the respective session state on the respective computer system or the at least one of the plurality of different computer systems via recapitulation of the steps or actions that led to the respective session state.

23. A method, comprising:
capturing session state information for the first computer system in a structured state capture file, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
one or more applications currently executing on the first computer system;
one or more processes or services currently executing on the first computer system;
one or more network shares currently mounted on the first computer system;
one or more documents presently open on the first computer system;
location, size, and placement of one or more windows on the first computer system;
one or more user profiles currently in use by the first computer system;
one or more background images and any other desktop customizations employed on the first computer system;
location and placement of one or more mouse or keyboard cursors of the first computer system;
placement of one or more icons and their order in a start bar or dock of the first computer system; or
text entered in one or more browser windows, text fields and other text areas on the first computer system; and
storing the structured state capture file in a memory of the first computer system, wherein the structured state capture file is useable to restore the session state on the first computer system or a different computer system via recapitulation of the steps or actions that led to the session state.

24. A method, comprising:
receiving a structured state capture file comprising session state information for a first computer system, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
one or more applications currently executing on the first computer system;
one or more processes or services currently executing on the first computer system;
one or more network shares currently mounted on the first computer system;
one or more documents presently open on the first computer system;
location, size, and placement of one or more windows on the first computer system;
one or more user profiles currently in use by the first computer system;
one or more background images and any other desktop customizations employed on the first computer system;
location and placement of one or more mouse or keyboard cursors of the first computer system;
placement of one or more icons and their order in a start bar or dock of the first computer system; or
text entered in one or more browser windows, text fields and other text areas on the first computer system; and
restoring the session state on the computer system using the structured state capture file, comprising:
retrieving session state information and the steps or actions that led to the session state from the structured state capture file; and
recapitulating the steps or actions on the computer system, thereby establishing the session state on the computer system.

25. A method, comprising:
storing session state information for a first computer system in a structured state capture file, wherein the structured state capture file comprises metadata describing the session state and does not include a register status, a memory image, or memory dump of the first computer system, wherein the structured state capture file further comprises data associated with steps or actions that led to the session state, wherein the session state information comprises one or more of:
one or more applications currently executing on the first computer system;

one or more processes or services currently executing on the first computer system;

one or more network shares currently mounted on the first computer system;

one or more documents presently open on the first computer system;

location, size, and placement of one or more windows on the first computer system;

one or more user profiles currently in use by the first computer system;

one or more background images and any other desktop customizations employed on the first computer system;

location and placement of one or more mouse or keyboard cursors of the first computer system;

placement of one or more icons and their order in a start bar or dock of the first computer system; or text entered in one or more browser windows, text fields and other text areas on the first computer system; and providing the structured state capture file to the first computer system or a different computer system over a network, wherein the structured state capture file is useable to restore the session state on the first computer system or the different computer system via recapitulation of the steps or actions that led to the session state.

* * * * *